(12) United States Patent
Wang et al.

(10) Patent No.: US 12,514,684 B2
(45) Date of Patent: Jan. 6, 2026

(54) PATIENT SPECIFIC APPLIANCE DESIGN

(71) Applicant: ALIGN TECHNOLOGY, INC., San Jose, CA (US)

(72) Inventors: Yuxiang Wang, Newark, CA (US); Jeremy Riley, Mountain View, CA (US); Ryan Kimura, San Jose, CA (US); Jun Sato, San Jose, CA (US); Luyao Cai, Santa Clara, CA (US); Kevin Weia, San Jose, CA (US); Manlio Fabio Valdivieso Casique, Santa Clara, CA (US); Andrei Soldatov, Sunnyvale, CA (US)

(73) Assignee: Align Technology, Inc., San Jose, CA (US)

( * ) Notice: Subject to any disclaimer, the term of this patent is extended or adjusted under 35 U.S.C. 154(b) by 355 days.

(21) Appl. No.: 17/823,835

(22) Filed: Aug. 31, 2022

(65) Prior Publication Data

US 2023/0062670 A1    Mar. 2, 2023

Related U.S. Application Data

(60) Provisional application No. 63/260,834, filed on Sep. 1, 2021.

(51) Int. Cl.
*A61C 7/08* (2006.01)
*A61C 7/00* (2006.01)
*A61C 7/36* (2006.01)

(52) U.S. Cl.
CPC ............. *A61C 7/08* (2013.01); *A61C 7/002* (2013.01); *A61C 7/36* (2013.01)

(58) Field of Classification Search
CPC ....... A61C 7/00–002; A61C 7/08; A61C 7/10; A61C 2007/004; G06F 17/21; G06F 17/30; G06T 17/00; G06T 17/20; G06T 7/11; G06T 7/60; G06T 2207/20084; G06T 2207/30036; G06T 2210/41; G06T 2219/2004; G06T 2219/2016
See application file for complete search history.

(56) References Cited

U.S. PATENT DOCUMENTS

| | | |
|---|---|---|
| 5,820,368 A | 10/1998 | Wolk |
| 6,183,248 B1 | 2/2001 | Chishti et al. |
| 6,309,215 B1 | 10/2001 | Phan et al. |
| 6,386,864 B1 | 5/2002 | Kuo |
| 6,454,565 B2 | 9/2002 | Phan et al. |

(Continued)

*Primary Examiner* — Thomas C Barrett
*Assistant Examiner* — Matthew P Saunders
(74) *Attorney, Agent, or Firm* — FisherBroyles, LLP

(57) ABSTRACT

A method for generating and fabricating a dental device having a body. The body may have a first plurality of tooth receiving cavities shaped to receive teeth of a first side of an arch. The body may also have a second plurality of tooth receiving cavities shaped to receive teeth of a second side of an arch. A palatal portion may extend between the first plurality of tooth receiving cavities and the second plurality of tooth receiving cavities. The palatal portion may be shaped to apply an expansion force to the teeth of the first side of the arch and the teeth of the second side of the arch. The palatal portion may include a plurality of bands that extend between the first plurality of tooth receiving cavities and the second plurality of tooth receiving cavities, each respective band may have a respective different thickness.

19 Claims, 24 Drawing Sheets

(56) References Cited

U.S. PATENT DOCUMENTS

| | | |
|---|---|---|
| 6,471,511 B1 | 10/2002 | Chishti et al. |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,126,726 B2 * | 2/2012 | Matov .................. B33Y 50/00 702/155 |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,344,385 B2 | 5/2022 | Morton et al. |
| 11,376,101 B2 | 7/2022 | Sato et al. |
| 11,419,702 B2 | 8/2022 | Sato et al. |
| 11,419,710 B2 | 8/2022 | Mason et al. |
| 11,471,253 B2 | 10/2022 | Venkatasanthanam et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2007/0168152 A1 * | 7/2007 | Matov .................. A61C 7/002 702/155 |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2009/0291417 A1 * | 11/2009 | Rubbert ............... A61C 9/0046 703/11 |
| 2010/0055635 A1 | 3/2010 | Kakavand |
| 2010/0129763 A1 | 5/2010 | Kuo |
| 2011/0269092 A1 | 11/2011 | Kuo et al. |
| 2014/0067334 A1 | 3/2014 | Kuo |
| 2015/0265376 A1 | 9/2015 | Kopelman |
| 2015/0366638 A1 | 12/2015 | Kopelman et al. |
| 2016/0193014 A1 | 7/2016 | Morton et al. |
| 2016/0199215 A1 * | 7/2016 | Kopelman ............ A61F 5/566 128/848 |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007367 A1 * | 1/2017 | Li .................... A61C 7/002 |
| 2017/0100214 A1 * | 4/2017 | Wen .................... A61C 7/08 |
| 2017/0135792 A1 | 5/2017 | Webber |
| 2017/0135793 A1 | 5/2017 | Webber et al. |
| 2017/0165032 A1 | 6/2017 | Webber et al. |
| 2018/0360567 A1 | 12/2018 | Xue et al. |
| 2019/0000592 A1 | 1/2019 | Cam et al. |

(56) References Cited

U.S. PATENT DOCUMENTS

| | | |
|---|---|---|
| 2019/0000593 A1 | 1/2019 | Cam et al. |
| 2019/0046297 A1 | 2/2019 | Kopelman et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1* | 7/2020 | Wang ............... A61C 7/002 |
| 2020/0390523 A1 | 12/2020 | Sato et al. |
| 2021/0147672 A1 | 5/2021 | Cole et al. |

\* cited by examiner

PATIENT SPECIFIC APPLIANCE DESIGN

CROSS-REFERENCE TO RELATED APPLICATION

This application claims priority to U.S. Provisional Application No. 63/260,834, filed 1 Sep. 2021, the entirety of which is incorporated by this reference.

BACKGROUND

Orthodontic and dental treatments using a series of patient-removable appliances (e.g., "aligners") are very useful for treating patients, particularly for malocclusions. Treatment planning is typically performed in conjunction with the dental professional (e.g., dentist, orthodontist, dental technician, etc.), by generating a model of the patient's teeth in a final configuration and then breaking the treatment plan into a number of intermediate stages (steps) corresponding to individual appliances that are worn sequentially. This process may be interactive, adjusting the staging and in some cases the final target position, based on constraints on the movement of the teeth and the dental professional's preferences. Once the final treatment plan is finalized, the series of aligners and other orthodontic appliances may be manufactured corresponding to the treatment planning.

This treatment planning may include using various orthodontic appliances to treat certain conditions. For example, a palatal expander may be used to slowly expand the roof of the mouth and widen the upper jaw, to address conditions such as crossbites or tooth crowding. Palatal expanders are often customized per-patient and per-stage. However, the customization may be limited, which may lead to certain drawbacks. For example, the expansive force may be too large or small for different patient morphologies. Additionally, the distribution of the expansive force may not be uniform. Such issues may arise due to, for instance, the designs failing to properly account for differences between patients, e.g., for patients with deeper or shallower palate, wider or narrower arch, or also when the patient morphology changes significantly during treatment.

The methods and apparatuses described herein may improve appliance designing, including potentially increasing the speed at which appliance designs may be optimized, as well as providing greater control to the dental professional, and allowing improved patient experience with the appliance. Patient comfort may be improved by the methods and apparatuses described herein. For example, palatal device thickness may be reduced making more room for the tongue as the patient's palate expands during treatment.

SUMMARY

As will be described in greater detail below, the present disclosure describes various systems and methods for customizing appliance design for patients.

In addition, the systems and methods described herein may improve the functioning of a computing device by reducing computing resources and overhead for optimizing an appliance design, thereby improving processing efficiency of the computing device over conventional approaches. These systems and methods may also improve the field of orthodontic treatment by analyzing data to efficiently design an appliance based on target forces, and further improve a patient experience using the optimized appliance designs.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Figure 1A:
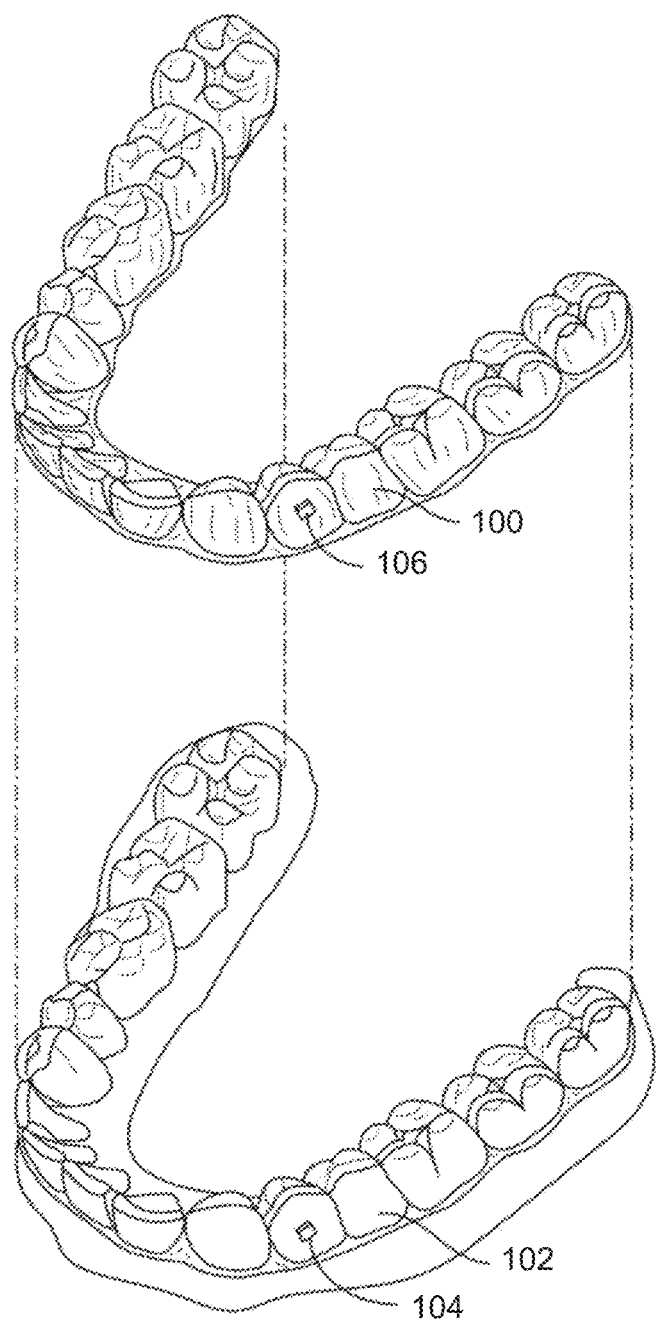
FIG. 1A illustrates an exemplary tooth repositioning appliance or aligner that can be worn by a patient in order to achieve an incremental repositioning of individual teeth in the jaw, in accordance with some embodiments.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. In some embodiments, the applicant may include a palatal expander including one or more tooth engaging structures, such as tooth receiving cavities, to receive teeth of the right and left sides of the upper jaw, and a palatal section that extends between the right and left tooth engaging structures.

An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth) and palate and may be fabricated based on positive or negative models of the patient's teeth and mouth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth are repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
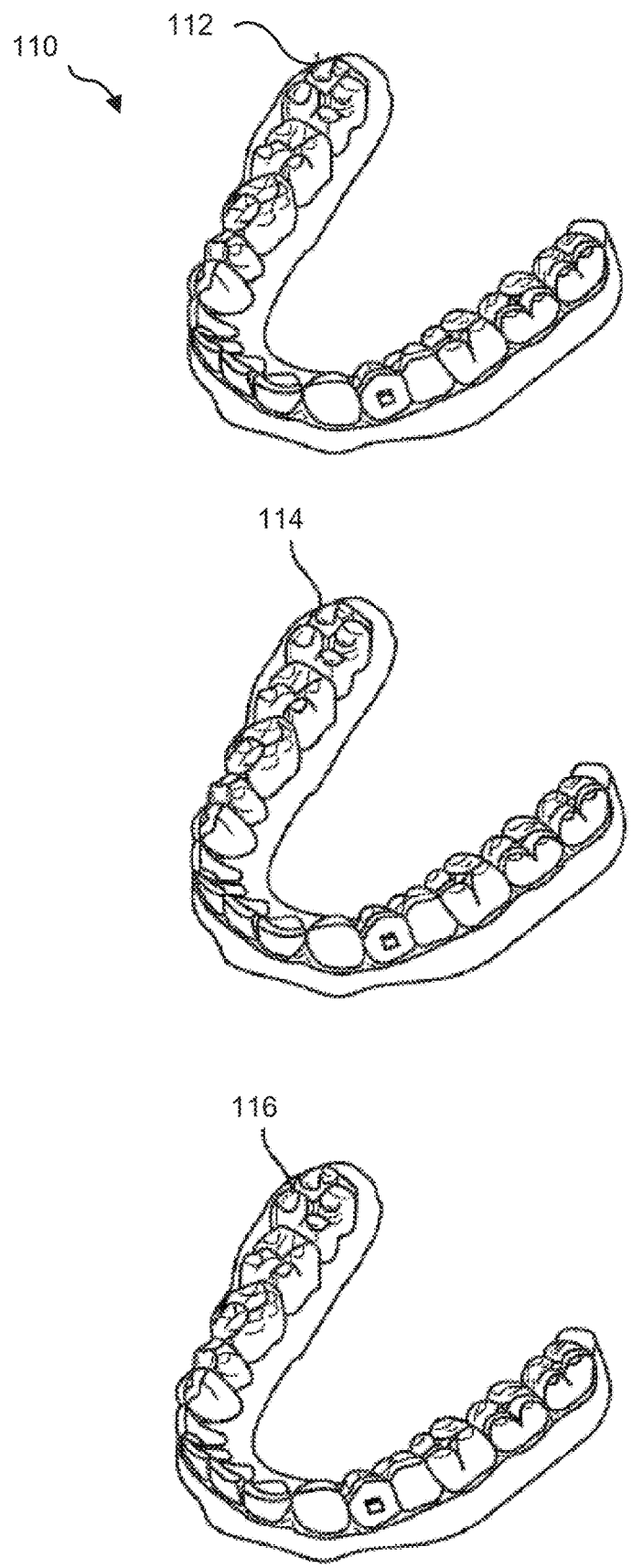
FIG. 1B illustrates a tooth repositioning system, in accordance with some embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Although depicted as orthodontic aligners, in some embodiments, the appliances may be other types, such as palatal expanders. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. In some embodiments, the appliance may widen the palate of a patient. The first appliance may be an initial palate width, one or more intermediate appliance corresponding to one or more intermediate palate widths, and a final appliance corresponding to a target width. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
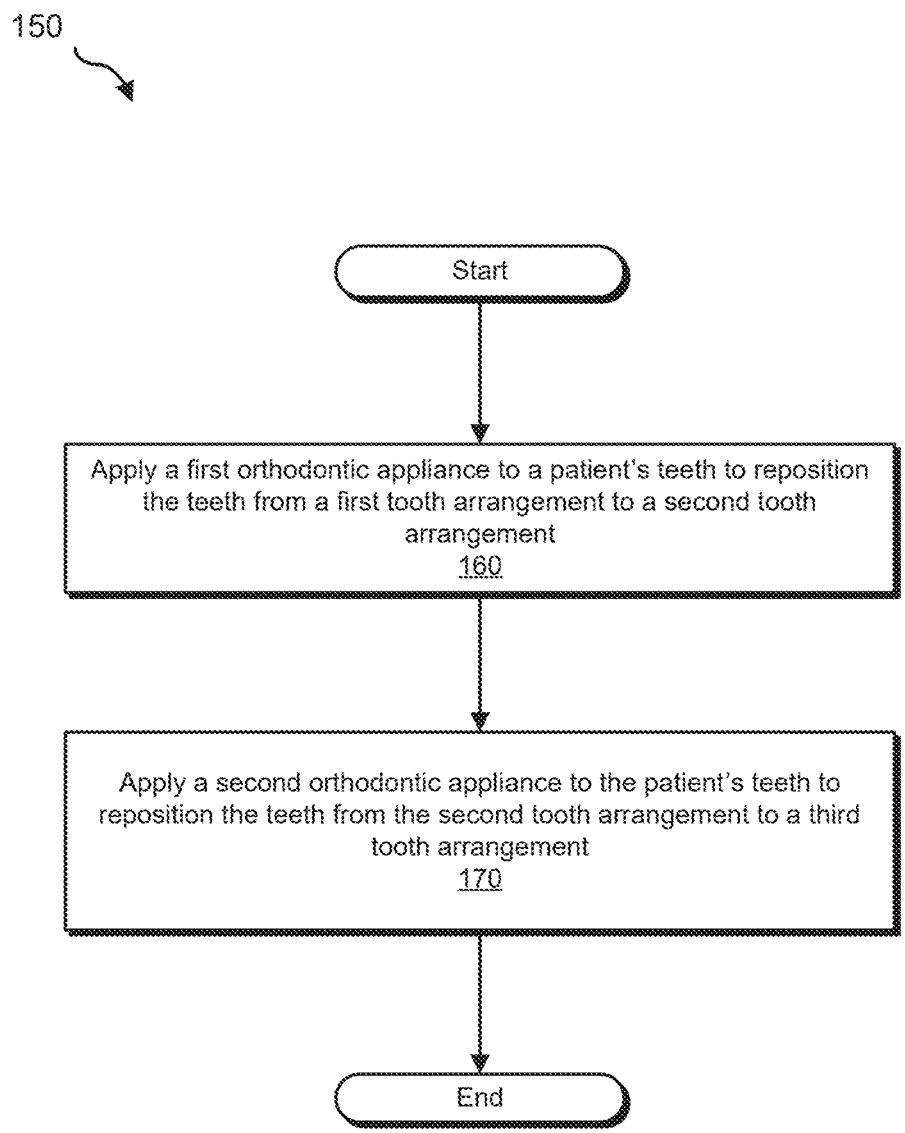
FIG. 1C shows a method of orthodontic treatment using one or more appliances, in accordance with some embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement or expand a palate from a first width to a second width. In step 170, a second orthodontic appliance is applied to the patient's teeth in order to reposition the teeth from the second tooth arrangement to a third tooth arrangement or a palate from the second width to a third width. The method 150 can be repeated as necessary using any suitable number and combination of sequential appliances in order to incrementally reposition the patient's teeth from an initial arrangement to a target arrangement and/or a palate from a first width or position to a target width or position. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication."

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 m, or within a range from about 5 m to about 50 m, or within a range from about 20 m to about 50 m.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
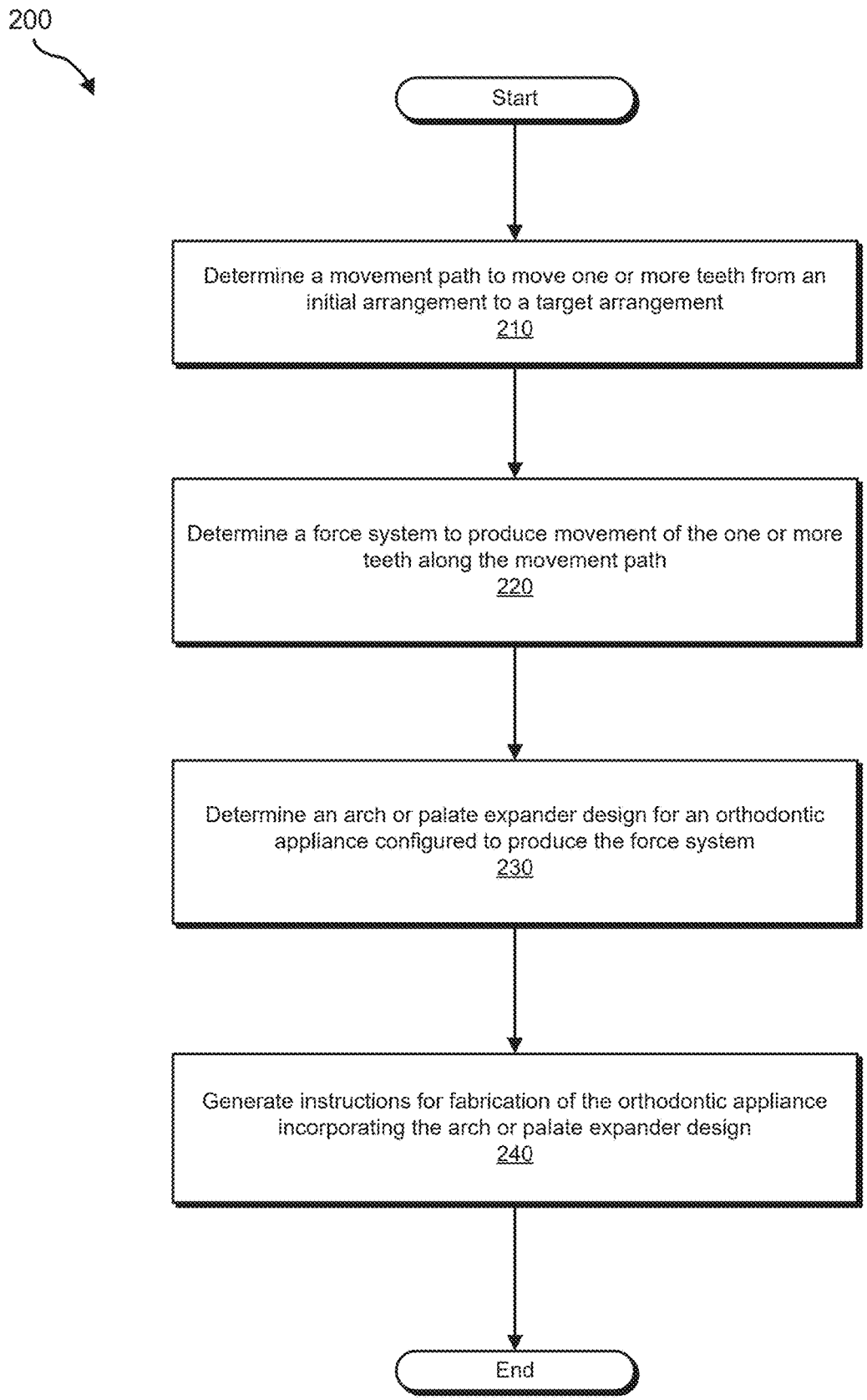
FIG. 2 illustrates a method for designing an orthodontic appliance to be produced via direct fabrication, in accordance with some embodiments.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth or a movement of the palate may be defined. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path or to expand the palate is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as Xray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA(Abaqus) software products from Dassault Systemes of Waltham, Mass.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the arch or palate expander design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) The upper arch and palate of the patient is scanned intraorally to generate three-dimensional data of the palate and upper arch; 2) The three-dimensional shape profile of the appliance is determined to provide a gap and teeth engagement structures as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
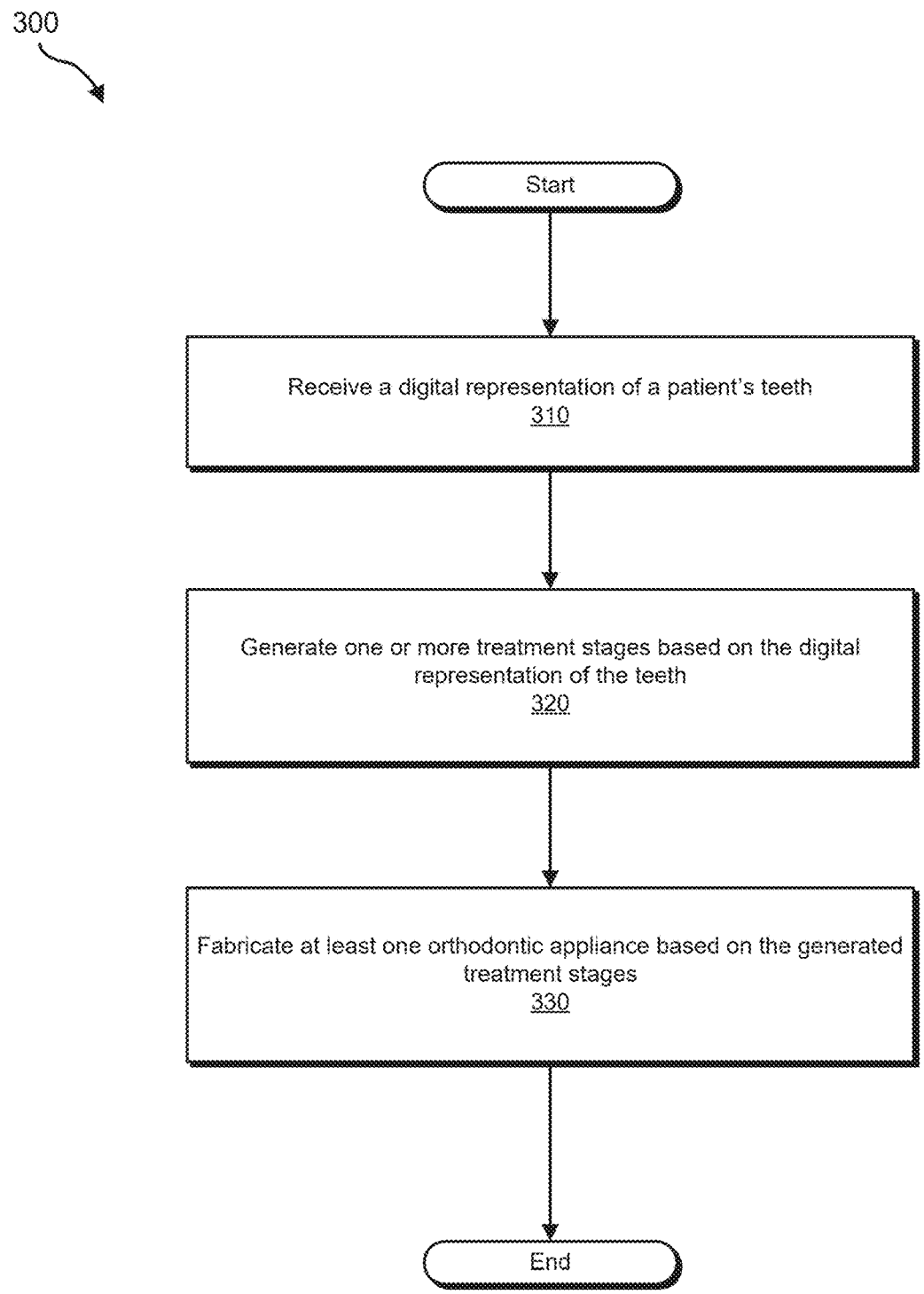
FIG. 3 illustrates a method for planning an orthodontic treatment and/or fabricating an appliance, in accordance with some embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth from step 310), followed by design and/or fabrication of an orthodontic appliance based on a representation of the patient's teeth in the arrangement represented by the received representation.

A "dental consumer," as used herein, may include a person seeking assessment, diagnosis, and/or treatment for a dental condition (general dental condition, orthodontic condition, endodontic condition, condition requiring restorative dentistry, etc.). A dental consumer may, but need not, have agreed to and/or started treatment for a dental condition. A "dental patient" (used interchangeably with patient herein) as used herein, may include a person who has agreed to diagnosis and/or treatment for a dental condition. A dental consumer and/or a dental patient, may, for instance, be interested in and/or have started orthodontic treatment, such as treatment using one or more (e.g., a sequence of) aligners (e.g., polymeric appliances having a plurality of tooth-receiving cavities shaped to successively reposition a person's teeth from an initial arrangement toward a target arrangement).

A "dental professional" (used interchangeably with dentist, orthodontist, and doctor herein) as used herein, may include any person with specialized training in the field of dentistry, and may include, without limitation, general practice dentists, orthodontists, dental technicians, dental hygienists, etc. A dental professional may include a person who can assess, diagnose, and/or treat a dental condition. "Assessment" of a dental condition, as used herein, may include an estimation of the existence of a dental condition. An assessment of a dental condition need not be a clinical diagnosis of the dental condition. In some embodiments, an "assessment" of a dental condition may include an "image-based assessment," that is an assessment of a dental condition based in part or on whole on photos and/or images (e.g., images that are not used to stitch a mesh or form the basis of a clinical scan) taken of the dental condition. A "diagnosis" of a dental condition, as used herein, may include a clinical identification of the nature of an illness or other problem by examination of the symptoms. "Treatment" of a dental condition, as used herein, may include prescription and/or administration of care to address the dental conditions. Examples of treatments to dental conditions include prescription and/or administration of brackets/wires, clear aligners, and/or other appliances to address orthodontic conditions, prescription and/or administration of restorative elements to address bring dentition to functional and/or aesthetic requirements, etc.

Figure 4:
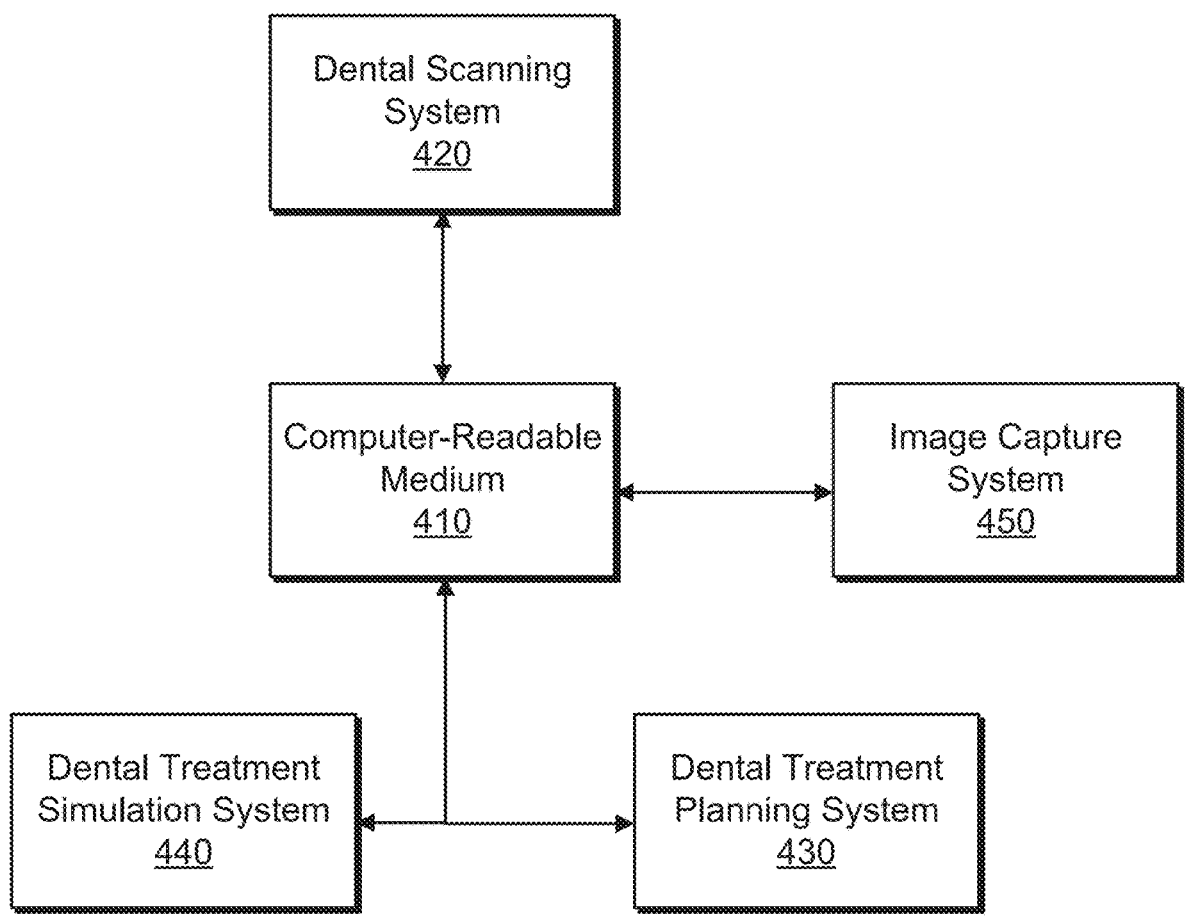
FIG. 4 illustrates a system for simulating and planning an orthodontic treatment, in accordance with some embodiments.

FIG. 4 shows a system 400 for simulating and planning an orthodontic treatment, in accordance with some embodiments. In the example of FIG. 4, the system 400 includes a computer-readable medium 410, a dental scanning system 420, a dental treatment planning system 430, a dental treatment simulation system 440, and an image capture system 450. One or more of the elements of the system 400 may include elements of such as those described with reference to the computer system shown in FIGS. 18 and/or 19 and vice versa. One or more elements of system 400 may also include one or more computer readable media including instructions that when executed by a processor, for example, a processor of any of systems 420, 430, 440, and 450 cause the respective system or systems to perform the processes described herein.

Dental scanning system 420 may include a computer system configured to capture one or more scans of a patient's dentition. Dental scanning system 420 may include a scan engine for capturing 2D or 3D images of a patient. Such images may include images of the patient's teeth, face, and jaw, for example. The images may also include x-rays, computed tomography, magnetic resonance imaging (MRI), cone beam computed tomography (CBCT), cephalogram images, panoramic x-ray images, digital imaging and communication in medicine (DICOM) images, or other subsurface images of the patient. The scan engine may also capture 3D data representing the patient's teeth, face, gingiva, or other aspects of the patient.

Dental scanning system 420 may also include a 2D imaging system, such as a still or video camera, an x-ray machine, or other 2D imager. In some embodiments, dental scanning system 420 may also include a 3D imager, such as an intraoral scanner, an impression scanner, a tomography system, a cone beam computed tomography (CBCT) system, or other system as described herein, for example. Dental scanning system 420 and associated engines and imagers can be used to capture the historic scan data for use in determining the historic mean parameters of a 3D parametric dental model, as described herein. Dental scanning system 420 and associated engines and imagers can be used to capture the 2D and 3D images of a patient's face and dentition for use in building a 3D parametric model of the patient's teeth as described herein. Examples of parametric models of the patient's teeth suitable for incorporation in accordance with the present disclosure are describe in U.S. application Ser. No. 16/400,980, filed on May 1, 2019, entitled "Providing a simulated outcome of dental treatment on a patient." published as US2020/0000551 on Jan. 2, 2020, the entire disclosure of which is incorporated herein by reference.

Dental treatment simulation system 440 may include a computer system configured to simulate one or more estimated and/or intended outcomes of a dental treatment plan. In some implementations, dental treatment simulation system 440 obtains photos and/or other 2D images of a consumer/patient. Dental treatment simulation system 440 may further be configured to determine tooth, lip, gingiva, and/or other edges related to teeth in the 2D image. As noted herein, dental treatment simulation system 440 may be configured to match tooth and/or arch parameters to tooth, lip, gingiva, and/or other edges. Dental treatment simulation system 440 may also render a 3D tooth model of the patient's teeth. Dental treatment simulation system 440 may gather information related to historical and/or idealized arches representing an estimated outcome of treatment. Dental treatment simulation system 440 may, in various implementations, insert, align, etc. the 3D tooth model with the 2D image of the patient in order to render a 2D simulation of an estimated outcome of orthodontic treatment. Dental treatment simulation system 440 may include a photo parameterization engine which may further include an edge analysis engine, an EM analysis engine, a course tooth alignment engine, and a 3D parameterization conversion engine. The dental treatment simulation system 440 may also include a parametric treatment prediction engine which may further include a treatment parameterization engine, a scanned tooth normalization engine, and a treatment plan remodeling engine. Dental treatment simulation system 440 and its associated engines may carry out the processes described herein, for example with reference to FIGS. 2, 3, 5, 15 and/or 17.

Dental treatment planning system 430 may include a computer system configured to implement treatment plans. Dental treatment planning system 430 may include a rendering engine and interface for visualizing or otherwise displaying the simulated outcome of the dental treatment plan. For example, the rendering engine may render the visualizations of the 3D models described herein. Dental treatment planning system 430 may also determine an orthodontic treatment plan for moving a patient's teeth from an initial position, for example, based in part on the 2D image of the patient's teeth, to a final position. Dental treatment planning system 430 may be operative to provide for image viewing and manipulation such that rendered images may be scrollable, pivotable, zoomable, and interactive. Dental treatment planning system 430 may include graphics rendering hardware, one or more displays, and one or more input devices. Some or all of dental treatment planning system 430 may be implemented on a personal computing device such as a desktop computing device or a handheld device, such as a mobile phone. In some embodiments, at least a portion of dental treatment planning system 430 may be implemented on a scanning system, such as dental scanning system 420. Image capture system 450 may include a device configured to obtain an image, including an image of a patient. The image capture system may comprise any type of mobile device (iOS devices, iPhones, iPads, iPods, etc., Android devices, portable devices, tablets), PCs, cameras (DSLR cameras, film cameras, video cameras, still cameras, etc.). In some implementations, image capture system 450 comprises a set of stored images, such as images stored on a storage device, a network location, a social media website, etc.

As described herein, evenly distributed expansion forces with appropriate magnitudes may be achieved by adjusting the design, including thickness distributions and device shape, based on the calculation of the resultant force magnitude and distribution. The corresponding model may be either a heuristic model based on experiments and/or numerical simulations, or directly using numerical simulations.

After generation of a first appliance design, the design may be compress in the finite element tool and analyzed based on at least the two following quantities: (1) the expansion force provided by this design, and (2) the distribution of the force on different teeth.

Based on the two quantities above, and if they are sub-optimal, the design may be accordingly changed in an iterative fashion until the ideal result is achieved.

The simulation may be a simple linear calculation and may be done within seconds, in some examples. As will be described further herein, an example workflow may include: (a) generating designs divided into three bands, and generate variations across many patients & thickness values, (b) running finite element ("FE") simulations on each band separately and recording the correlations between thicknesses and achieved expansion forces given patient anatomy, and (c) performing machine learning using regularized multi-linear regressions to fit the FE results for deployment in production.

Figure 5:
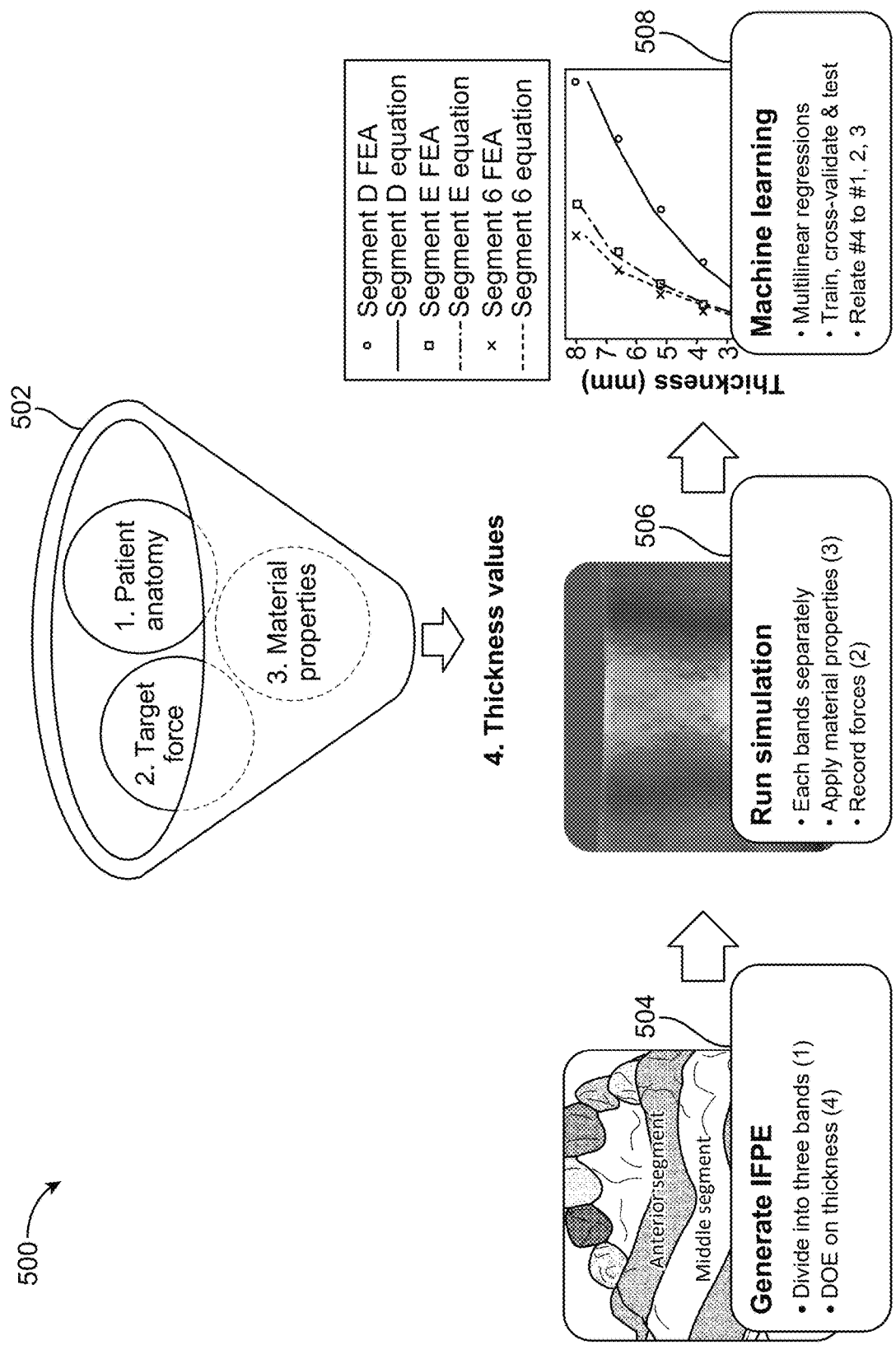
FIG. 5 illustrates a diagram of a workflow for customizing an appliance design, in accordance with some embodiments.

FIG. 5 illustrates a workflow 500 of an example process for designing patient specific appliances. At model 502, thickness values of an appliance may be calculated using several inputs, such as patient anatomy, target force, and/or material properties. The thickness values may, in some embodiments, refer to optimized or near-optimized thicknesses for appliances. In other words, an optimal design for an appliance, given the patient's anatomy, target forces to be applied by the appliance (e.g., applied to the patient's anatomy), for material properties used for fabrication, may include the thickness values.

Patient anatomy may, in some embodiments, include a patient's dentition (e.g., arrangement and shape of teeth), and/or other body part features, such as a size and/or dimensions between body parts (e.g., locations/shapes of teeth and distances between teeth). Target forces may, in some embodiments, include expansion forces provided by the design (e.g., expansion across a palatal axis) and a force distribution on the patient's teeth (e.g., how forces may be applied to each tooth). Material properties may, in some embodiments, include various physical properties of materials used, such as Young's Modulus, etc.

When modeling forces applied to a patient's anatomy, the appliance design (e.g., shape, thickness, etc.) may be an input for determining the forces applied by the appliance. In other words, the thickness values may be used to determine the forces applied such that the thickness values may be adjusted to apply target forces. However, treatment plans or guidelines may define a target force range (e.g., the force may vary by a factor of 4-5 from an anterior to a posterior of the appliance). As patient anatomies may vary, which may affect the forces applied by a given design, a direct conversion from target forces to thickness values may not be feasible. Thus, model 502 may provide for calculating desired thickness values using patient anatomy, target force, and material properties.

Model 502 may be developed as further illustrated with steps 504, 506, and 508. At step 504, an appliance (e.g., palatal expander) may be designed and prepared for analysis on thickness values. The design may be divided into several bands, as further illustrated in FIG. 6.

Figure 6:
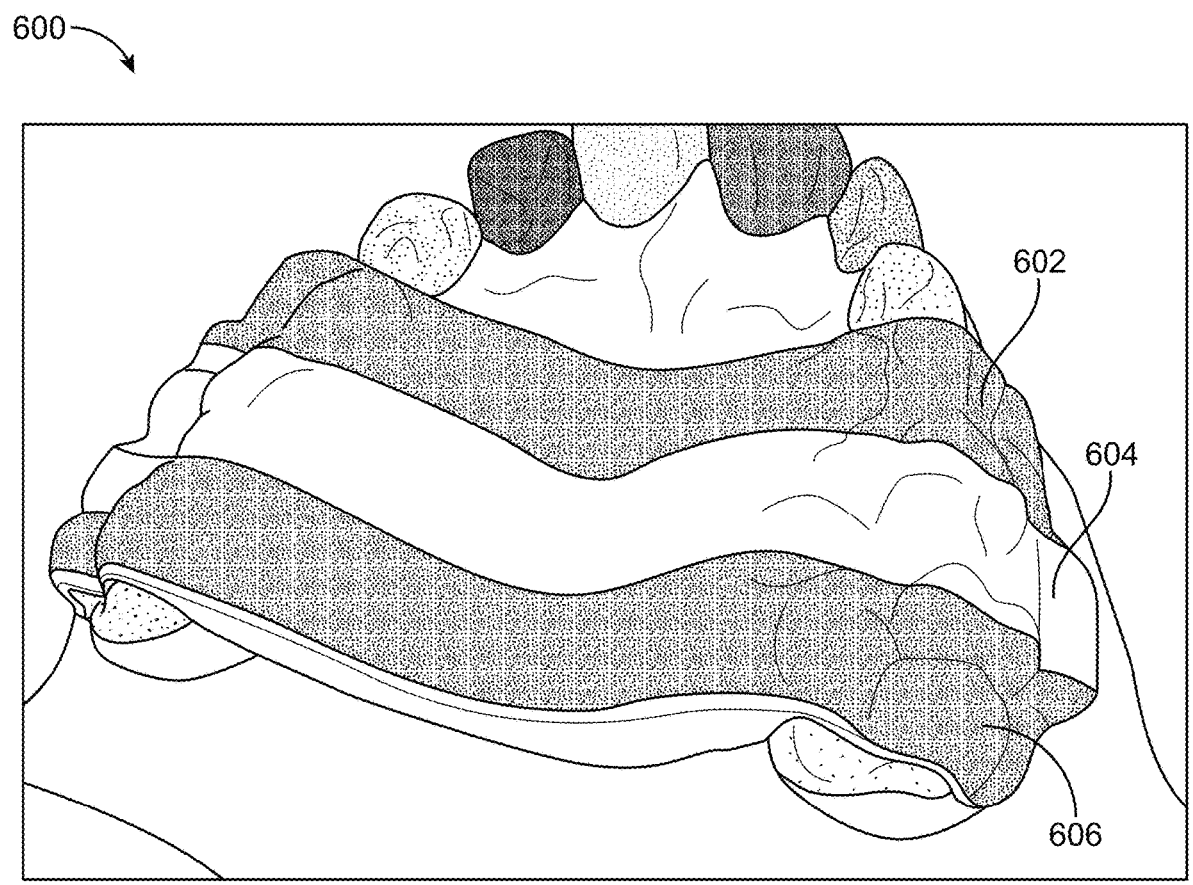
FIG. 6 illustrates an appliance design divided into bands, in accordance with some embodiments.

FIG. 6 illustrates an appliance design 600 that may be simplified by decoupling into three bands, a band 602, a band 604, and a band 606. Although the thickness of one of the bands may impact stiffness of the entire device, such decoupling may allow focusing on optimizing each band. As can be seen in FIG. 6, bands 602, 604, and 606 may similar or equal widths (e.g., equidistant) which may, in some examples, be equivalent to or more robust slicing than aligning with the patient's anatomy (e.g., by aligning with certain teeth and/or tooth features such as first primary molar, first permanent molar, etc.). This equidistant slicing may also approximate tooth-based balancing without requiring identifying and aligning teeth. Although FIG. 6 illustrates 3 bands, in other examples, fewer for more bands may be used. Dividing appliance design 600 into bands may reduce a complexity of analysis, described further herein, while providing a reasonable approximation of the forces applied by appliance design 600. Rather than modeling forces applied by the entire appliance design 600, appliance design 600 may be subdivided into bands 602, 604, and 606 to approximate the entire appliance design 600. Calculating the forces applied by bands 602, 604, and 606 and summing the calculated forces may not properly account for interaction between bands 602, 604, and 606 themselves (e.g., as they push against each other and further distribute force). However, optimizing bands 602, 604, and 606 individually (and subsequently combining the optimized bands) may be computationally less demanding than optimizing appliance design 600.

Returning to FIG. 5, at 506, each band may be analyzed separately. The analysis may include running simulations of each band, using the given material properties, to determine forces applied by each band. The analysis may include finite element analysis ("FEA"), as illustrated in FIG. 7.

Figure 7:
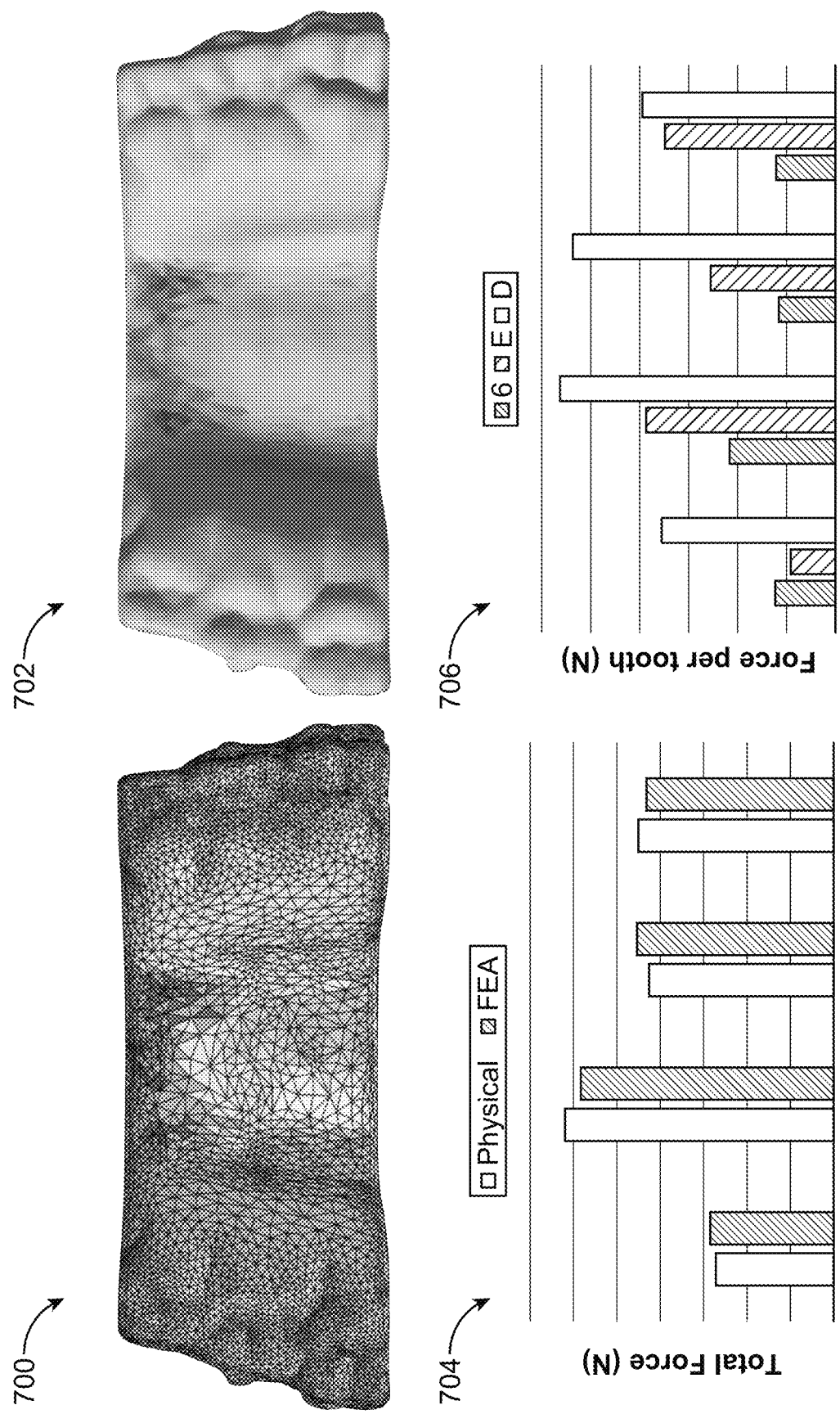
FIG. 7 illustrates example results of finite element analysis ("FEA"), in accordance with some embodiments.

FIG. 7 illustrates a first a first view 700 of an example of FEA results of a dental appliance and a second view 702 of the example of FEA results, an expansion force graph 704, and a force distribution graph 706. The first view 700 depicts the results along with a wireframe mesh triangulation used in the FEA procedure while the second view 702 depicts the results without the wireframe mesh triangulation. Expansion force graph 704 illustrates relative total forces calculated using FEA for four different dental appliances, such as four different palatal expanders. The right bar in each pair shows the force as determined through FEA while the left bar shows the relative force as measured on a physical dental appliance, such as determined with a tensile, compression, or other force testing or other machines, such as an Instron machine. Graph 704 shows that the numerically calculated forces closely match the actual forces. Force distribution graph 706 illustrates the relative calculated forces per tooth for four different appliances, such as four palatal expanders. The left bar represents the relative force on tooth 6, the center bar represents the relative force on tooth E, and the right bar represented the relative force on tooth D. While depicted as analysis of the entire dental appliances, as discussed herein, the analysis may be carried out for each individual band. In some embodiments, tooth 6 is the first permanent molar, tooth E is the second primary molar, and tooth D is the first primary molar. In some embodiments, the teeth may be the first permanent premolar, second permanent premolar, and the first permanent molar.

Returning to FIG. 5, at 508 a model may be created (e.g., model 502) using machine learning. For example, multilinear regressions may be used to train, cross-validate and test the forces recorded at 506. Thickness values may then be correlated to patient anatomy, target force, and material properties.

Figure 8:
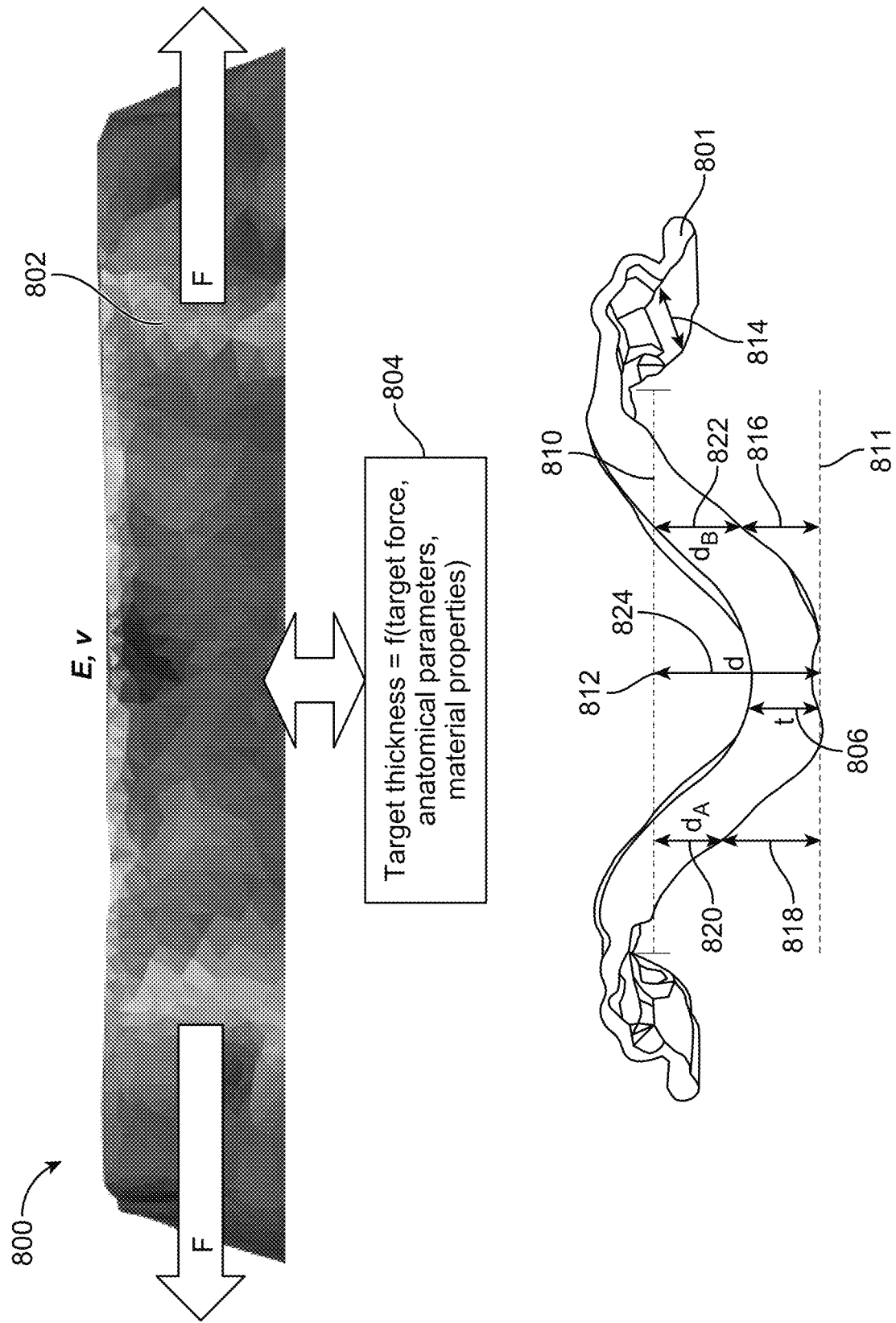
FIG. 8 illustrates a relationship between force and appliance thickness, in accordance with some embodiments.

FIG. 8 illustrates a model 800 relating thickness to patient anatomy, target force, and material properties. For example, an FEA 802 (which may correspond to FEA described herein) may produce force calculations that may be used to build a function 804 that may produce a target thickness based on inputs target force, anatomical parameters, and material properties. Thickness values 806 may be output by function 804. As illustrated in FIG. 8, thickness values 806 may correspond to dimension values of a band, such as palatal depth parameters.

In some embodiments, the material properties may be Young's Modulus and Poisson's Raito and may be used in determining the function 804, such as by machine learning or as otherwise described herein. In some embodiments, the anatomical parameters may be the crown-to-crown distance 810, which may be measured across the patient's arch, from crown center to crown center at the center of a band 602, 604, 606, the band's thickness 814, which may be measured in a mesial-distal direction. In some embodiments, the depth of the palate 824 at the center of the palate and the depths 820, 822 of the palate at locations ⅓ of the distance between the center of the palate and the crown center, measured at either ⅓ the distance away from the center or ⅓ of the distance away from the crown center. In some embodiments, the depths 820, 822, 824 may be measured from a line extending between respective crown centers and the palate. In some embodiments, the depths 818, 816, which may be a difference between the central depth and the depth 820, 822. In some embodiments, the depth 824 is measured to a line 811, which may be a line parallel to line 810 that intersects the patient's palate, such as the furthest point on the palate.

The appliance may include a handle 801 that extends buccally from the tooth receiving cavities of the appliance. The handle provides a structure, not participating in the treatment, such as not shaped to reposition teeth, for a patient to grip or apply force to in order to remove the appliance from the patient's arch. The handle 801 may be located above the gingival line of the appliance and of the patient, when worn.

Figure 9A:
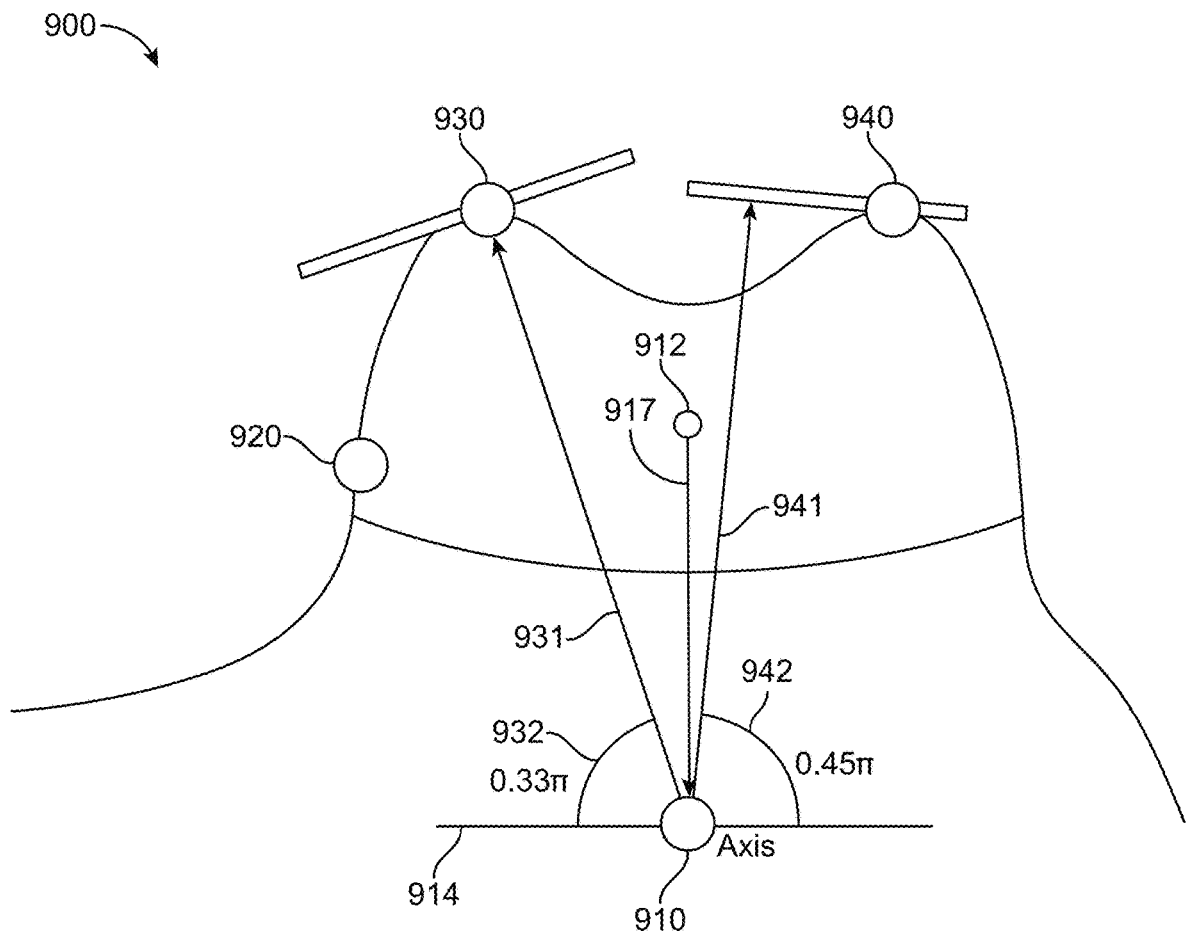
FIG. 9A illustrates an example diagram of lingual and buccal ridge points, in accordance with some embodiments.
Figure 9B:
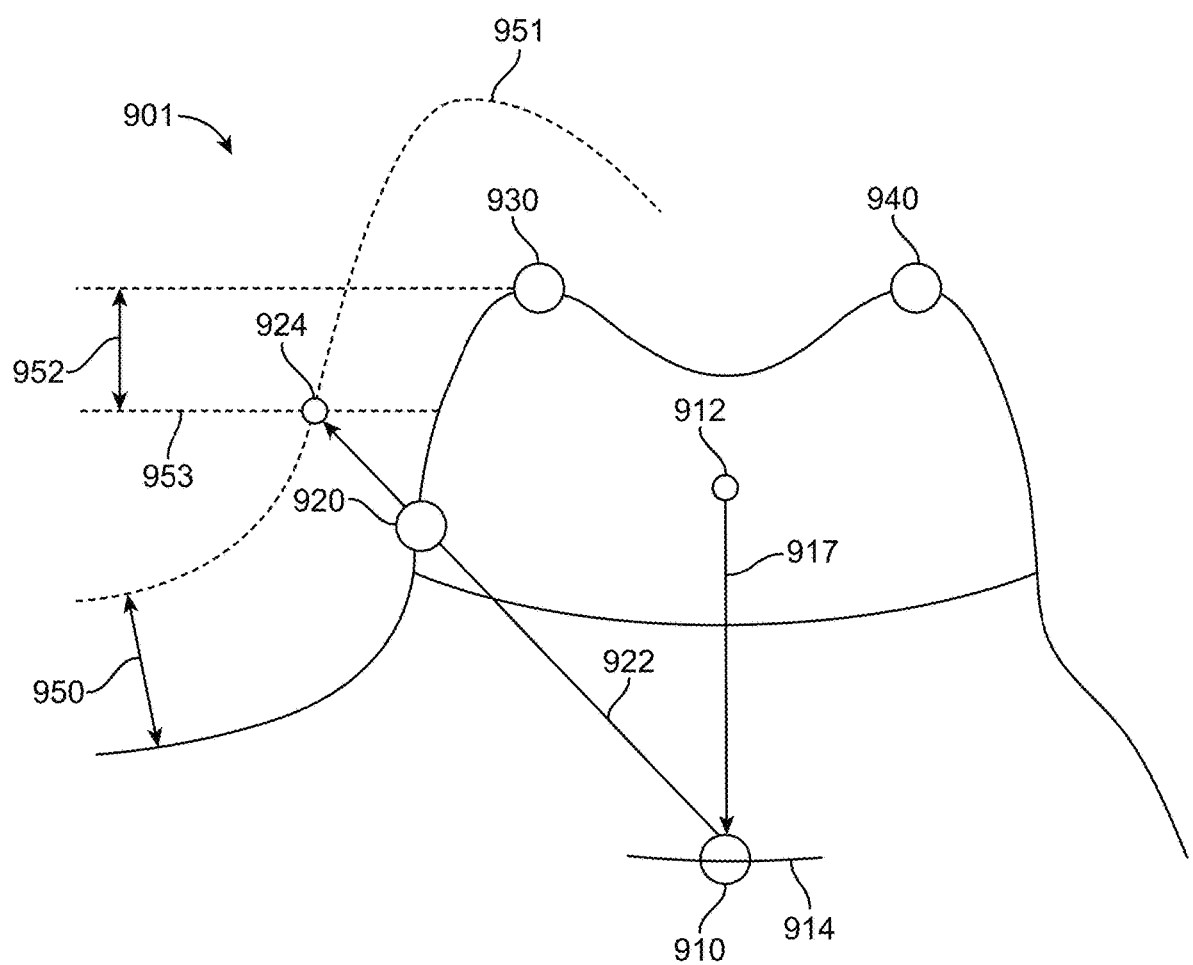
FIG. 9B illustrates an example diagram of lingual transition points, in accordance with some embodiments.
Figure 9C:
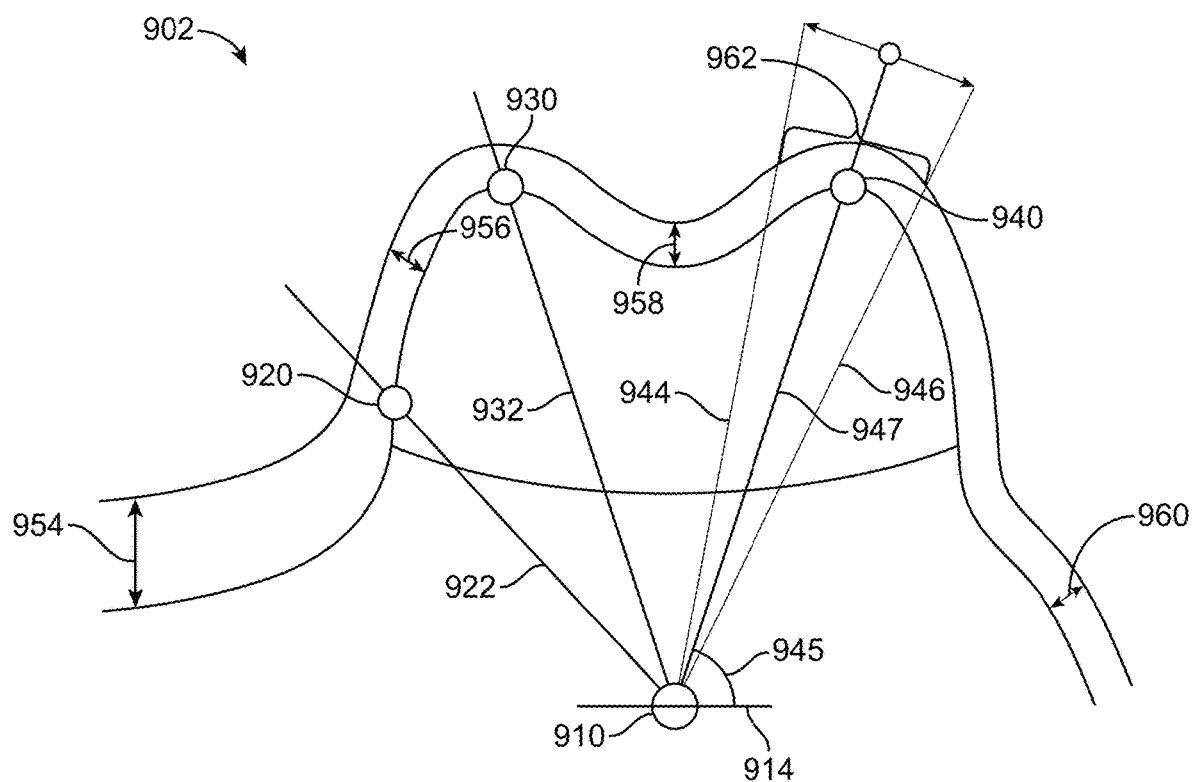
FIG. 9C illustrates an example diagram relating angle to thickness, in accordance with some embodiments.

FIGS. 9A, 9B, and 9C illustrate diagrams of an exemplary 2D representations 900, 901, and 902, respectively of a tooth for calculating thickness values. In some examples, the 2D representations may be extrapolated into 3D, for example along an arch. In some examples, the 2D representations may each correspond to a slice of a 3D image and/or model of the patient's dentition and orthodontic appliance.

As illustrated in FIGS. 9A-9C, 2D representations 900, 901, and 902 may include a crown center 912 and an axis point 910. Crown center 912 may correspond to a center point of a tooth, such as a center based on dimensions, geometric centroid of the crown, and/or other center as may be determined from a model. Axis point 910 may correspond to an offset from crown center 912, such as an offset based on a parameter, such as a crown axis distance parameter. The crown axis distance parameter may be in a range of 3 mm to 10 mm, 6 mm to 8 mm, or about 7 mm). Additional points and/or angles (based on rays originating from axis point 910) can be calculated from axis point 910. For example, ridge points, which may correspond to crown ridges, may be determined based on a farthest point of the crown from axis point 910 on the respective lingual and buccal ridges of the crown cross-section.

In some embodiments, 2D representations 900, 901, and 902 may include a lingual ridge angle 932 with respect to axis point 910 used to define a lingual ridge point 930. Lingual ridge point 930 may correspond to a ridge point in the lingual direction. Lingual ridge point 930 may be defined as location on the crown furthest from the axis point 910 along the ray 931. The angle of the ray from axis point 910 may be with respect to a reference axis 914 that is perpendicular to a ray 917 formed by crown center 912 and axis point 910. The furthest point along a ray may be defined by the location of an intersection of a line perpendicular to the ray with the crown furthest from the axis point 910. In some embodiments, 2D representations 900, 901, and 902 may also include a buccal ridge point 940 defining a buccal ridge angle 942 with respect to axis point 910. Buccal ridge point 940 may correspond to a ridge point in the buccal direction. Buccal ridge angle 942 may be defined as an angle based on a ray from axis point 910 to buccal ridge point 940 with respect to reference axis 914. In some embodiments, the angles 932 and 942 may be between $0.27\pi$ and $0.477\pi$, more preferably between about $0.33 \pi$ and $0.45\pi$. In some embodiments, the angle 932 may be $0.337\pi$ and the angle 942 may be $0.45\pi$.

The thickness values of a dental appliance may be divided into thickness zones having a defined thickness profile based on the zones, such as a center thickness zone 954, a crown thickness zone 958, and a buccal thickness zone 960, as illustrated in FIG. 9C. Transition zones between the thickness zones may gradually change thickness from a first end (e.g., a first thickness zone) to a second end (e.g., a second thickness zone). For example, FIG. 9C illustrates a center-to-crown transitional zone 956 for transitioning between center thickness zone 954 and crown thickness zone 958, and a crown-to-buccal transitional zone 962 for transitioning between crown thickness zone 958 and buccal thickness zone 960.

Center-to-crown transitional zone 956 may be defined by a lingual transition angle 922 and lingual ridge angle 932, as shown in FIG. 9C. Lingual transition angle 922 may be defined by a ray from axis point 910 to lingual transition point 920 with respect to reference axis 914. FIG. 9B illustrates how lingual transition point 920 may be determined based on a band thickness 950. Band thickness 950 may initially be uniformly applied along the crown edge (e.g., extending in a normal direction from the crown surface). A lingual transition height 952, which may be a parameter such as between about 0.5 mm and 4 mm, between about 1 mm and 3 mm, or about 2 mm, may be offset from lingual ridge point 930 in a direction parallel to a line between the crown center and the axis point 910. Reference line 953 may be a line parallel to axis 914 and/or perpendicular to line 917. In some embodiments, the lingual transition height point 924 may be at an intersection of line 953 and the outer thickness 951. A ray from axis point 910 to lingual transition height point 924 may establish lingual transition angle 922 with respect to reference axis 914. Lingual transition point 920 may be defined as a point along the ray from axis point 910 to lingual transition height point 924 that intersects with the crown surface.

Crown-to-buccal transitional zone 962 may be defined by a buccal transition start ray 944 and a buccal transition ray 946, which may each correspond to predefined parameter values and may offset from a ray 947 defined by angle 945. The offset may be between 5 and 30 degrees. In some embodiments, the ray 944 may be offset from the ray 947 by an amount greater than the offset of ray 946. In some embodiments, the offset of ray 944 is 20 degrees and the offset of ray 946 may be 10 degrees. Thus, as illustrated in FIG. 9C, thickness values may transition from center thickness 954 to center-to-crown transitional zone 956, further transition to crown thickness 958 to crown-to-buccal transitional zone 962, and finally to buccal thickness 960, based on angles with respect to axis point 910. The center thickness 954 for each band may be different, based on the determined thickness, discussed herein. The center thickness 954 for band 602, the mesial band, may be in a rage of between 0.5 mm and 5.0 mm, preferably between 1.0 mm and 3.5 mm. The center thickness 954 for band 604, the center band, may be in a range of between 0.5 mm and 6.0 mm, preferably between 1.0 mm and 5.5 mm, more preferably in a range of between 2.0 mm and 4.5 mm. The center thickness 954 for band 606, the distal band. may be in a range of between 0.5 mm and 6.0 mm, preferably between 1.0 mm and 5.5 mm, more preferably in a range of between 2.0 mm and 4.5 mm. The buccal thickness 960 may be between 0.25 and 1.5 mm, preferably between 0.5 mm and 1.0 mm and most preferably, about 0.75 mm. The crown thickness 958 may be between 0.25 and 2.5 mm, preferably between 1.0 mm and 2.0 mm and most preferably, about 1.5 mm.

In some examples, 2D representations 900, 901, and 902 may be extrapolated into a 3D representation by establishing analogous points (e.g., axis point 910, lingual transition point 920, lingual ridge point 930, and buccal ridge point 940) for each crown or each crown cross section in each of the bands of the dental appliance, and establishing respective continuous curves along the arch for the analogous points. Thickness values may be extrapolated across these curves similar to the thickness values derived from the points as described above.

Figure 9D:
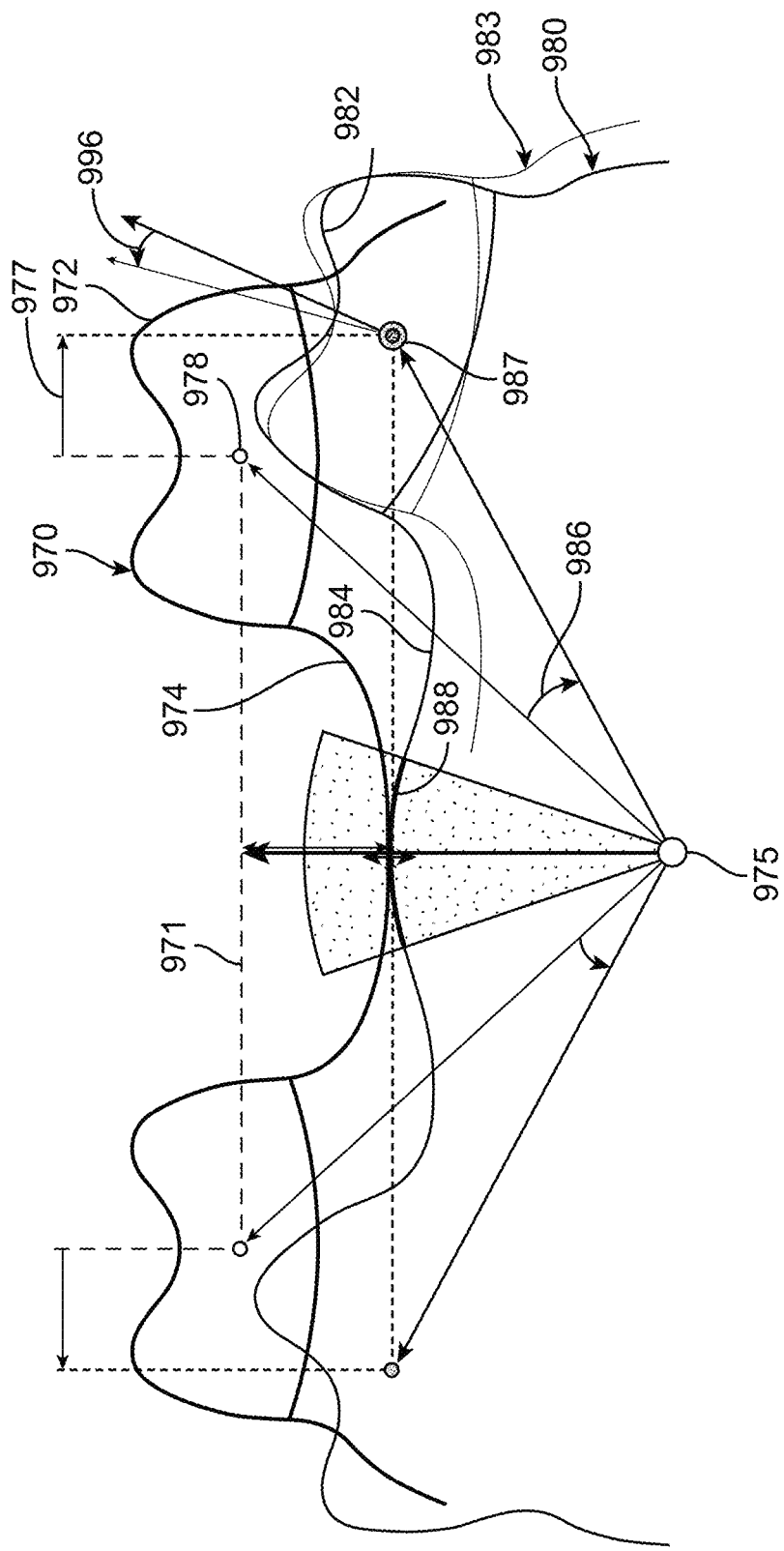
FIG. 9D illustrates an example diagram of tipping compensation, in accordance with some embodiments.

FIG. 9D depicts methods of expanding a palate, according to some embodiments. FIG. 9D includes a 2D slice of an initial position 970 of a three-dimensional model of an upper jaw of a patient. The initial position 970 includes shapes and positions of the patient's teeth 972, such as the teeth crowns, and palate 974.

FIG. 9D also includes a 2D slice of a target intermediate or target final position 980 of a patient's of a three-dimensional model of an expected or planed shape and position of a patient's jaw, including the patient's teeth 982, such as the teeth crowns, and palate 984. The model of the palate 984 may also include a remolded palate portion 988. When a palate is expanded, it expands at the median palatine suture which is pulled apart. During the expansion process new tissue, such as bone, grows as the palate expands. The remolded palate portion is an estimate of the new tissue and its shape. The palate may be expanded up by between 0.25 mm and 15 mm, preferably between 0.25 mm and about 12 mm over one or more stages of a treatment plan.

During the expansion process, the palate expands accordingly to a treatment plan. Each half of the palate expands half of the total planned expansion. The expansion of each half or side of the jaw is measured as the lateral distance 977 between the crown centers 978, 987. This distance may be measured parallel to the original crown center to crown center axis 971. The palate and the teeth may also rotate during expansion. The rotation may be measured as an angle 986 about the expansion axis 975, which is displaced a distance, such as 20-40 mm perpendicular to the center of the original crown center to crown center axis 971. Preferably the expansion axis is displaced 25-35 mm, preferable about 30 mm. The angle 986 is a measure of the angular displacement of the crown centers 978, 987 during treatment.

In some embodiments, rotation compensation may be used. The model 983 depicts a 2D slice of a 3D model of the target position of the palate and teeth after rotation companion. Rotation compensation imparts a rotation, in a direction opposite the rotation of angle 986, but about a different axis, such as an axis parallel to the expansion axis, but passing through the crown center 987. The magnitude of the rotation angle 996 may be about equal to or less than the angle 986. Preferably the rotation angle is between ⅕ and ½ of the magnitude of the rotation angle 986. More preferably between 25% and 40% and more preferably about ⅓ the magnitude of the rotation angle 986. Smaller angles are beneficial because they may be easier to achieve, while greater angles may provide better clinical results, such as better bites as compared to smaller angles.

Figure 10:
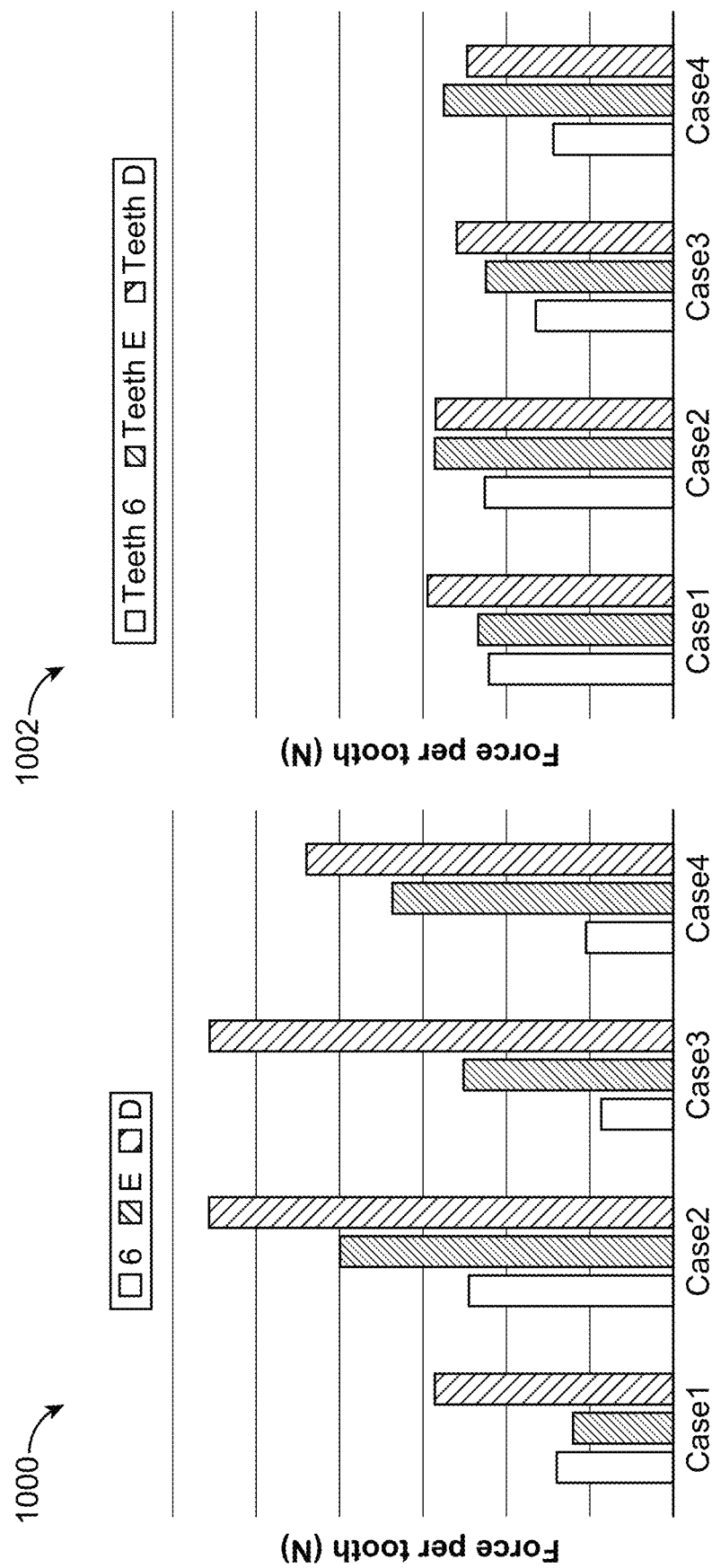
FIG. 10 illustrates graphs of appliance stiffness, in accordance with some embodiments.

FIG. 10 illustrates an initial design stiffness graph 1000 and an optimized design stiffness graph 1002 of relative forces. As can be seen in FIG. 10, forces may be higher for the anterior band for the initial design. After optimization, the forces may be more balanced. The left most bar represents the posterior or mesial band, the central bar represents the central band, and the right most bar represents the distal or anterior band.

Figure 11:
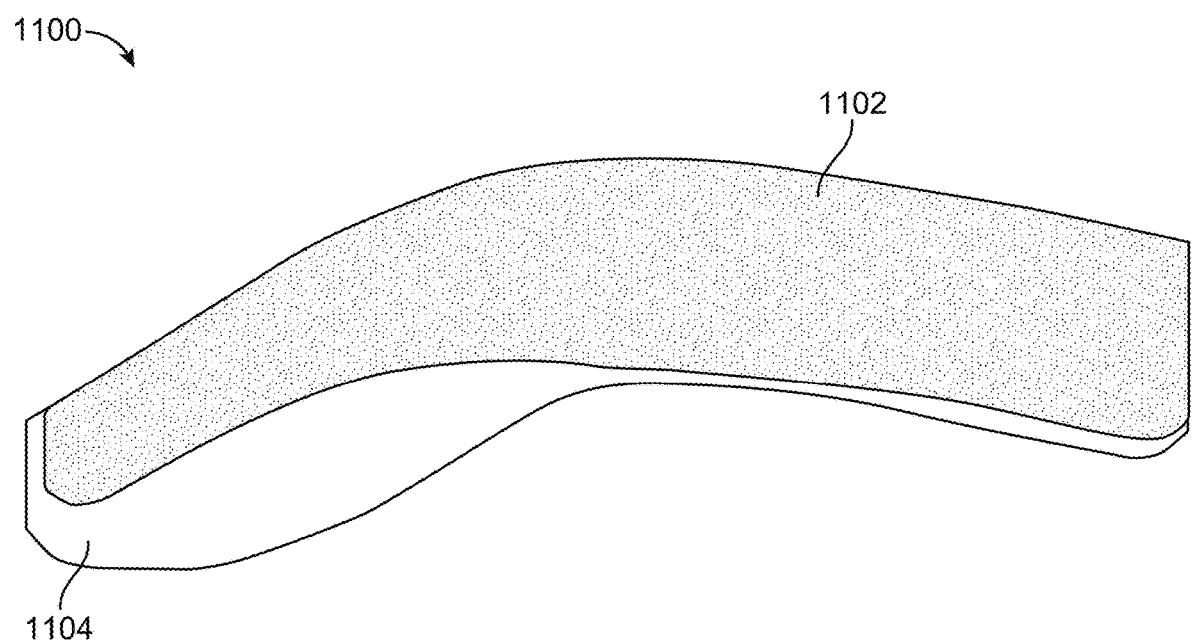
FIG. 11 illustrates optimization of an appliance, in accordance with some embodiments.

FIG. 11 illustrates a design delta of an example dental device 1100 showing two portions 1102, 1104. An initial design may include both the first portion of the thickness 1102 and a second portion 1104. During the optimization process, the dental device 1100 may start with excess thickness. As can be seen in FIG. 11, initial design may be overly thick. The optimizations described herein may remove material, including the second portion 1104 to form an optimized design including the first portion 1102. The removal of material may further benefit the patient by providing more room. For example, the removal of material in optimized design to the shape of the first portion 1102 may provide more room for the patient's tongue to move.

Figure 12:
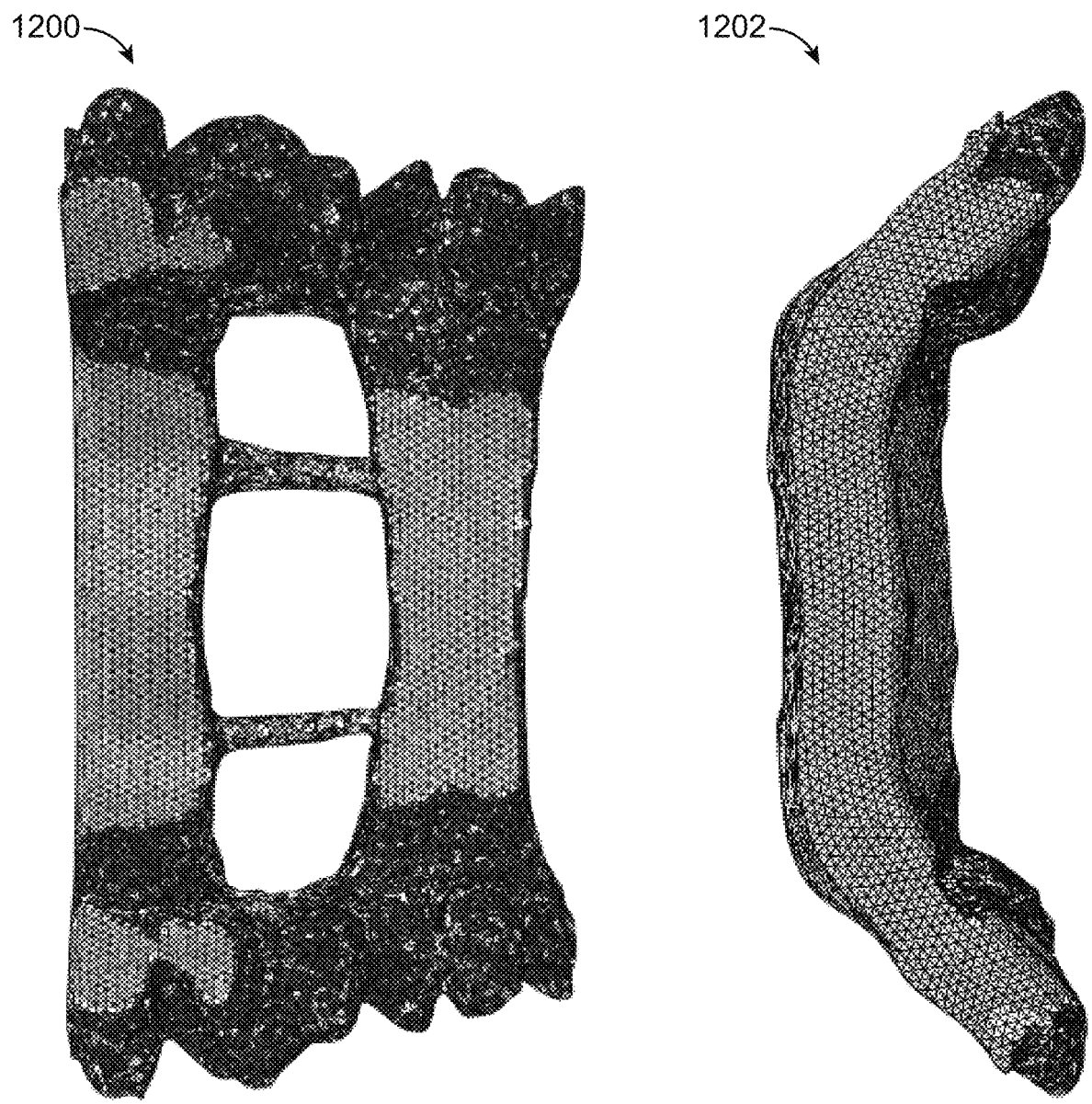
FIG. 12 illustrates example topology optimization for appliance design, in accordance with some embodiments.

FIG. 12 illustrates another optimization technique, such as topology optimization that may balance and control a stiffness of an appliance. The process may start with an overly thick appliance design. Then, topology optimization may be used to reduce both the force and volume of the appliance until the target force is achieved. This method may have the following control variables: The relative stiffness values desired for each tooth may be an input to form the topology optimization's target function. For example, doctors may prefer the stiffness in the posterior to be larger than at the anterior. Such considerations may be input into the algorithm to generate the right geometry for this purpose.

Some optimizations may choose to only remove material from the bottom side (rather than the palatal side) of the device to prevent food from getting stuck. Moreover, to save time, the force-volume curve given by the optimization may be used and interpolated in between to save computation time.

As illustrated in force heat map 1200 and force heat map 1202, topology optimization may result in balanced forces.

Figure 13:
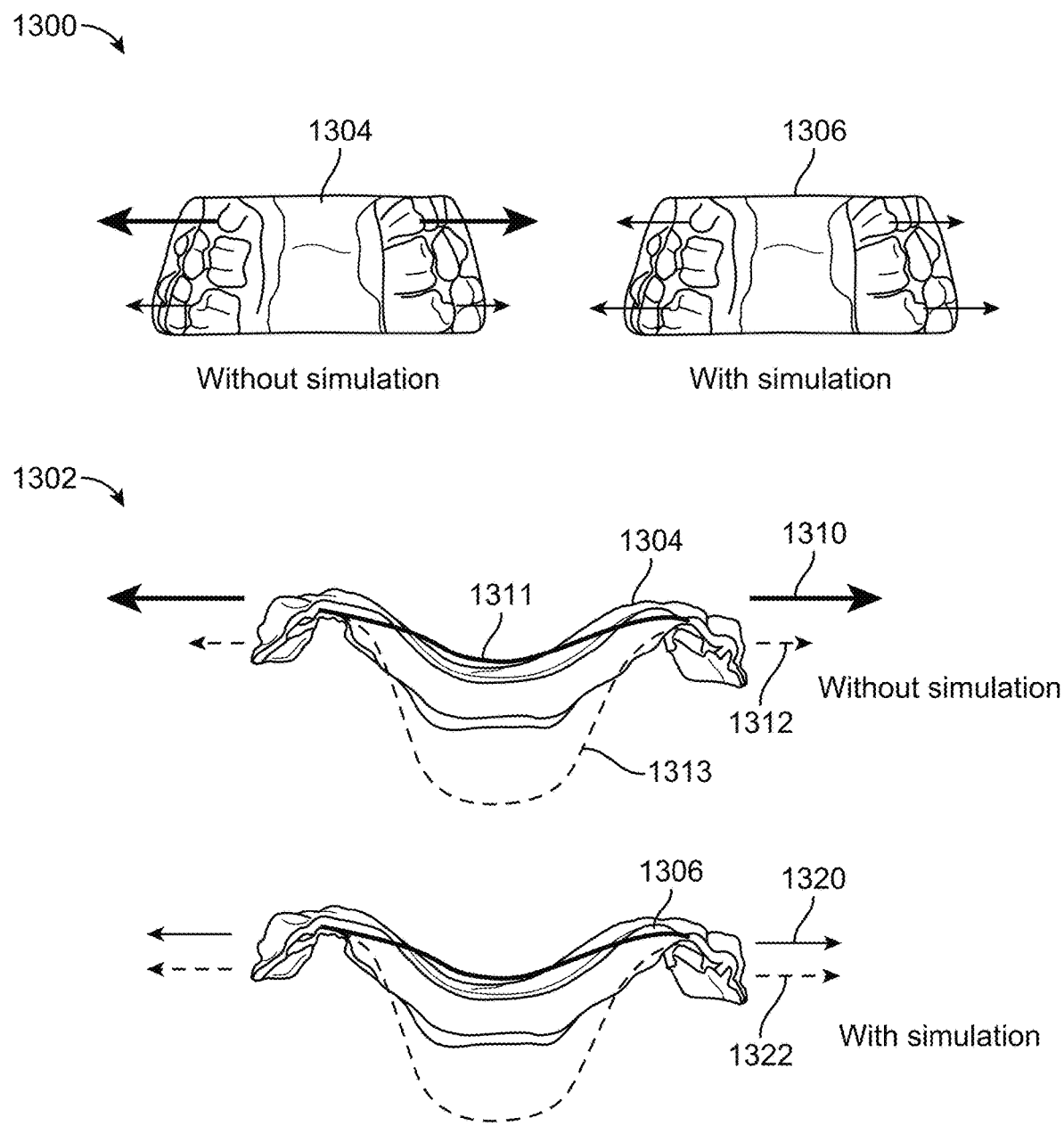
FIG. 13 illustrates force distribution in various designs, in accordance with some embodiments.

FIG. 13 illustrates results of a comparison of force distributions of design 1304 without simulation (e.g., optimization as described herein) and design 1306 with simulation/optimization using the methods described herein. As shown in view 1300, the thickness of the appliance may be adjusted such that the force may be balanced from anterior to posterior. As further shown in view 1302, design 1304, without simulation, may result in different amounts of forces 1310, 1312 with different palatal depths 1311, 1313, with the dental appliance applying lower forces with deeper palates. The design 1306 with optimization may exhibit relatively constant forces 1320, 1322 with respect to palatal depth as compared to design 1304 without optimization.

Figure 14:
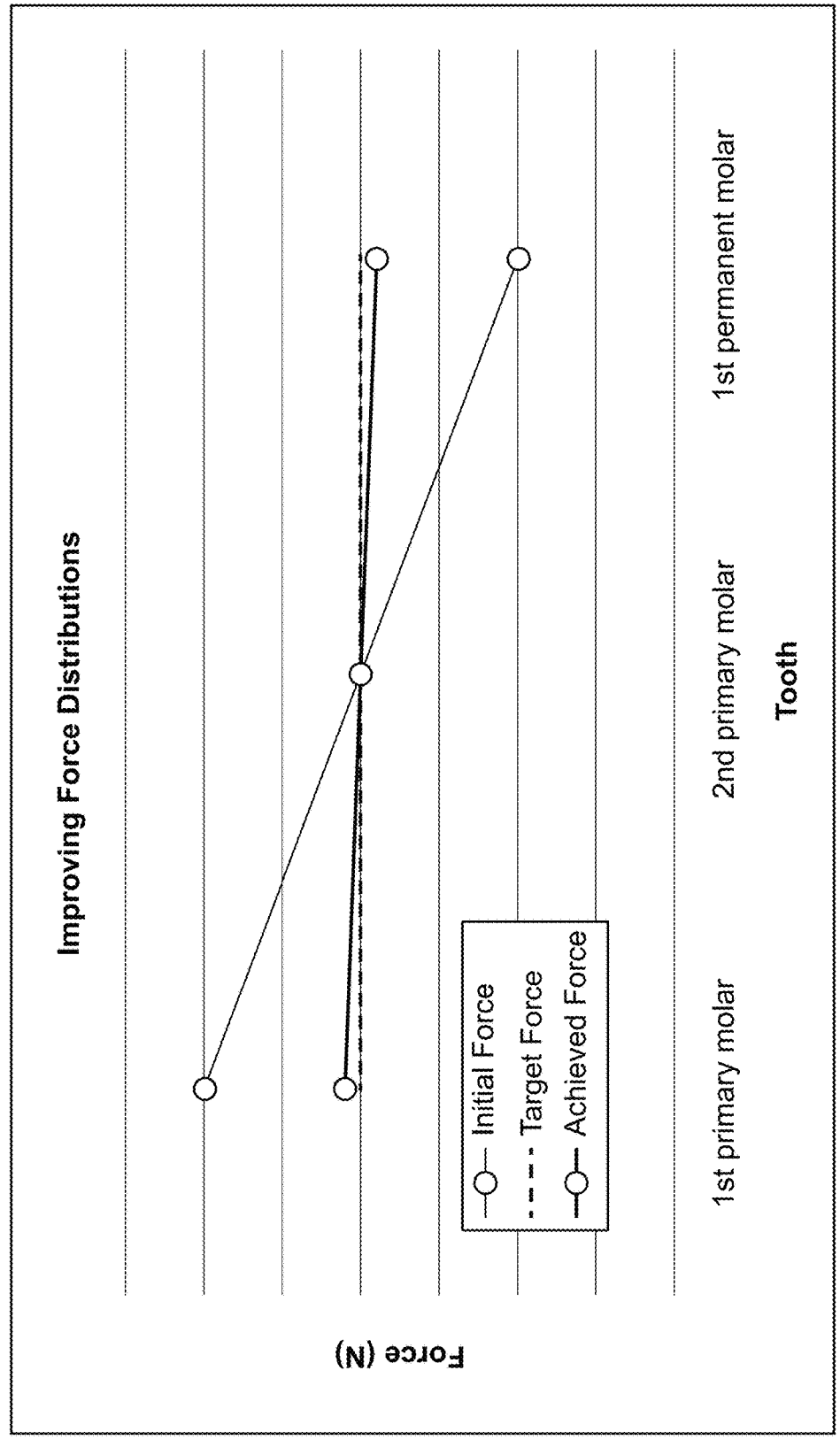
FIG. 14 illustrates a graph of force distribution, in accordance with some embodiments.

FIG. 14 illustrates a force distribution graph 1400. As illustrated in FIG. 14, the achieved force (after optimization) may be closer to the target force than the initial force (before optimization).

Figure 15:
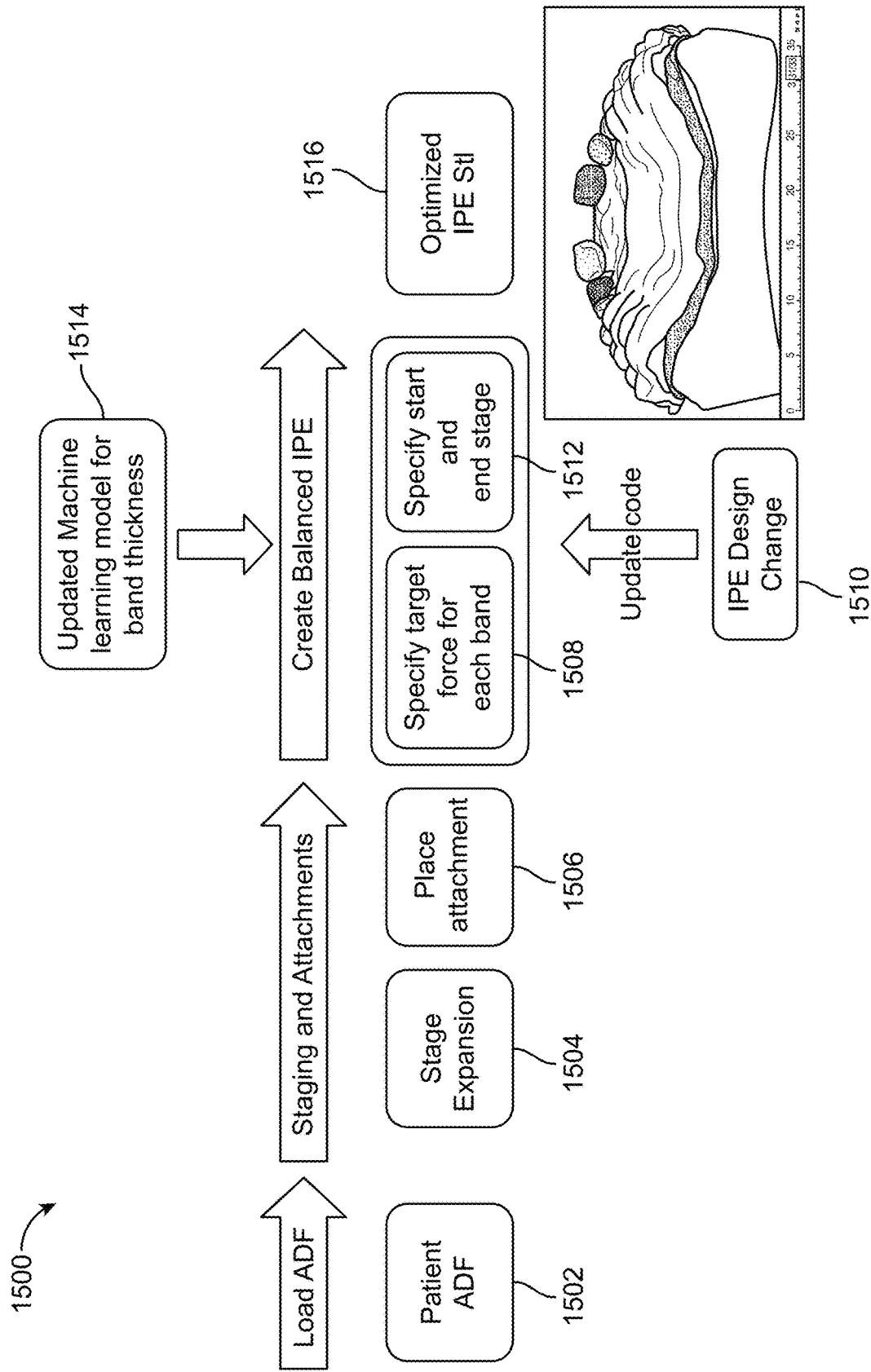
FIG. 15 illustrates an optimized workflow, in accordance with some embodiments.

FIG. 15 illustrates an optimized workflow 1500. At 1502, a patient's data may be loaded, which may include patient anatomy/dentition information in order to begin treatment planning. At 1504, treatment stages may be established and at 1506, attachments on appliances may be placed. In some embodiments, block 1506 may occur before block 1504.

At 1514, a machine learning model may be updated for band thicknesses. The design may be divided into bands such that at 1508, target forces may be specified for each band. At 1510, the bands may be iteratively updated as part of the optimization process.

At 1512, the start and end stages of treatment may be specified. At 1516, the optimized design may be finalized and prepared for fabrication.

Figure 16:
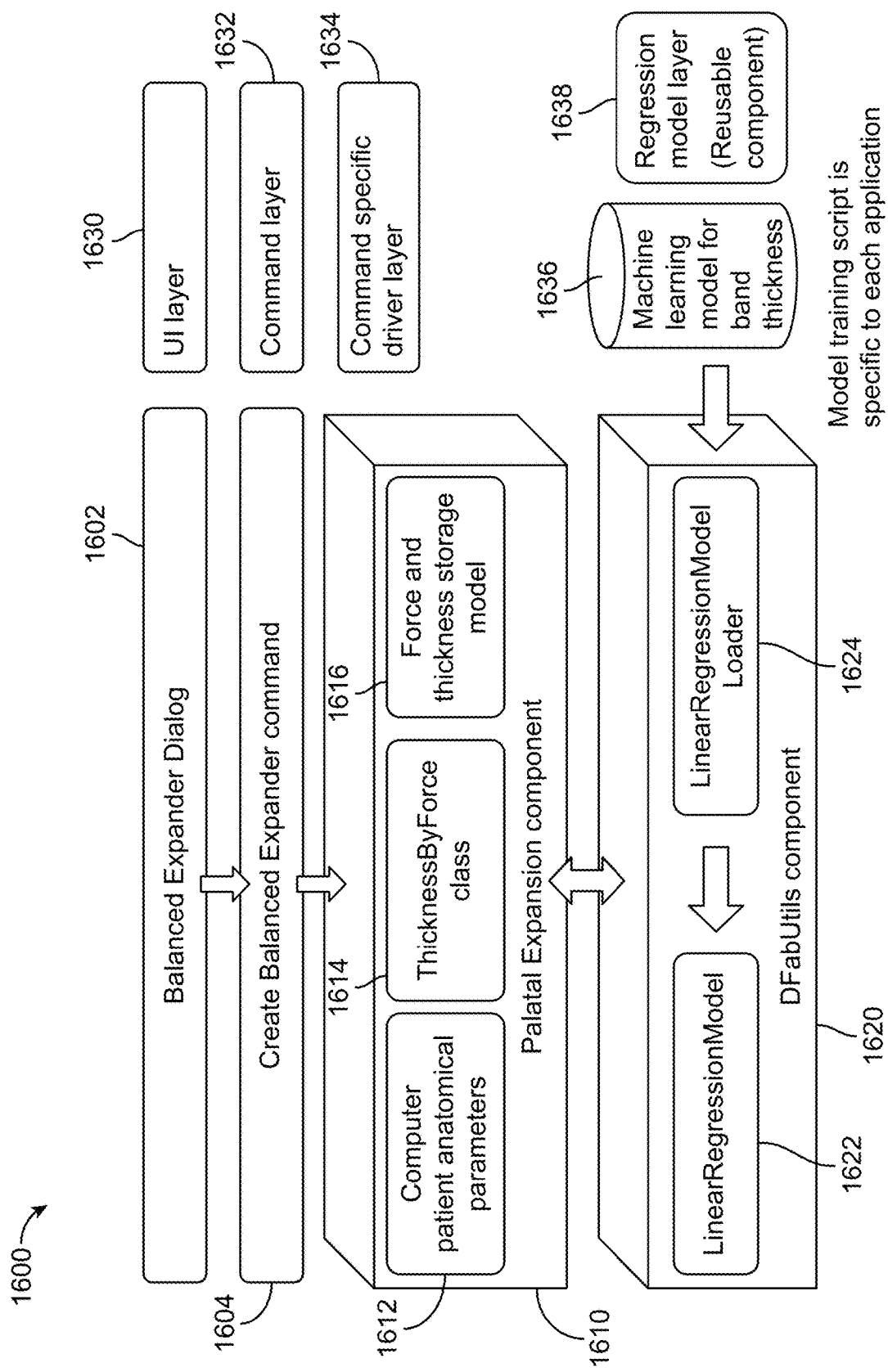
FIG. 16 illustrates example software components for patient specific appliance design, in accordance with some embodiments.

FIG. 16 illustrates software components 1600 which may perform the methods described herein and may correspond to the systems described herein. A doctor or dental professional may, at 1602 use an interface (e.g., balanced expander dialog) at UI layer 1630 to send a command at 1604 (e.g., create balanced expander command) at command layer 1632 to optimize or balance an appliance design.

In response to the command, a palatal expansion component 1610, at a command specific driver layer 1634, may compute patient anatomical parameters 1612, determine thickness by force at 1614, and establish a force and thickness storage model at 1616. Palatal expansion component 1610 may communicate with a utility component 1620. Utility component 1620 may use a model loader 1624, trained using a machine learning model 1636 for band thickness, and a regression model layer 1638 (which may be a reusable component), to establish a linear regression model 1622. Linear regression model 1622 may be used for determining thickness by force at 1614, for optimizing appliance designs.

Figure 17:
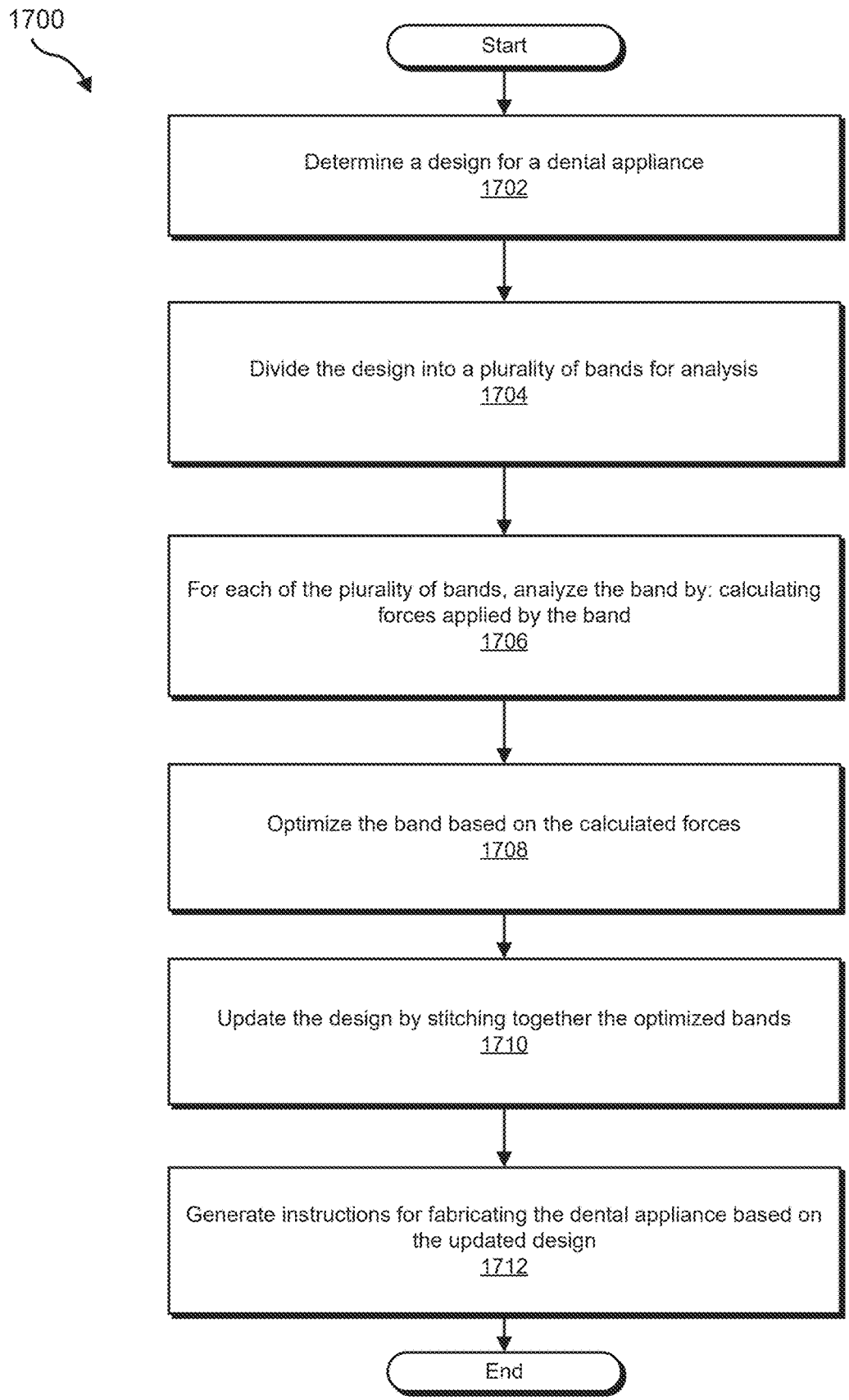
FIG. 17 illustrates an example method for patient specific appliance design, in accordance with some embodiments.

FIG. 17 is a flow diagram of an exemplary computer-implemented method 1700 for patient specific appliance design. The steps shown in FIG. 17 may be performed by any suitable computer-executable code and/or computing system, including the system(s) illustrated in FIGS. 4, 16, 18, and/or 19. In one example, each of the steps shown in FIG. 3 may represent an algorithm whose structure includes and/or is represented by multiple sub-steps, examples of which will be provided in greater detail below.

As illustrated in FIG. 17, at step 1702 one or more of the systems described herein may determine a design for the dental appliance. For example, the design may be a design for a palatal expander.

The systems described herein may perform step 1702 in a variety of ways. In one example, determining the design may include an overly thick design. For instance, removing material from the design may be simpler than adding material to the design. Thus, the initial design may be designed being too thick such that the optimization described herein may include removing the excess material.

At step 1704 one or more of the systems described herein may divide the design into a plurality of bands for analysis. For example, the design may be divided into three bands, although in other examples any other appropriate number of bands may be used.

At step 1706 one or more of the systems described herein may, for each of the plurality of bands, analyze the band by calculating forces applied by the band. The forces applied by the band may include, for example, an expansion force provided by the design and/or a force distribution on teeth of the patient.

The systems described herein may perform step 1706 in a variety of ways. In one example, calculating the forces applied may include calculating the forces applied based on a thickness of the band. The thickness may be measured in an occlusal direction.

In some examples, calculating the forces applied by the band may include generating a plurality of variations of the band varying by thickness and patient anatomy. Calculating the forces applied may further include performing finite element analysis on the band and determining a correlation between thickness and forces applied based on patient anatomy.

At step 1708 one or more of the systems described herein may, for each of the plurality of bands, analyze the band by optimizing the band based on the calculated forces. The systems described herein may perform step 1708 in a variety of ways. In one example, optimizing the band may include determining a desired thickness of the band based on an input anatomy and a desired force for the input anatomy.

In some examples, optimizing the band may include using machine learning to fit the design to the finite element analysis. The machine learning scheme may include a regularized multi-linear regression.

In some examples, optimizing the band may include using topology optimization to reduce forces applied and a volume of the band to achieve a target force. An input to the topology optimization may include a desired relative stiffness value for each tooth. The topology optimization may include using a force-volume curve to interpolate between the bands.

The topology optimization (and/or other optimizations described herein) may include removing material from the design to reduce forces applied and the volume of the band. In some examples, material may be removed from a non-palatal side of the band. In some examples, the thickness may be reduced along the occlusal direction. In some examples, the thickness may be determined based on thickness calculations as described herein with respect to FIGS. 9A-9C.

At step 1710 one or more of the systems described herein may update the design by stitching together the optimized bands. The systems described herein may perform step 1710 in a variety of ways. In one example, stitching together the optimized bands may include using a smoothing function between each band for each desired thickness.

At step 1712 one or more of the systems described herein may generate instructions for fabricating the dental appliance based on the updated design. For example, any of the fabrication methods described herein may be used.

Although method 1700 is presented as a sequence of steps, in some examples, the steps of method 1700 may be repeated as needed to optimize each band. Thus, certain steps may be repeated, and/or performed in a different order, and/or in parallel as part of the same or different iteration.

Computing System

Figure 18:
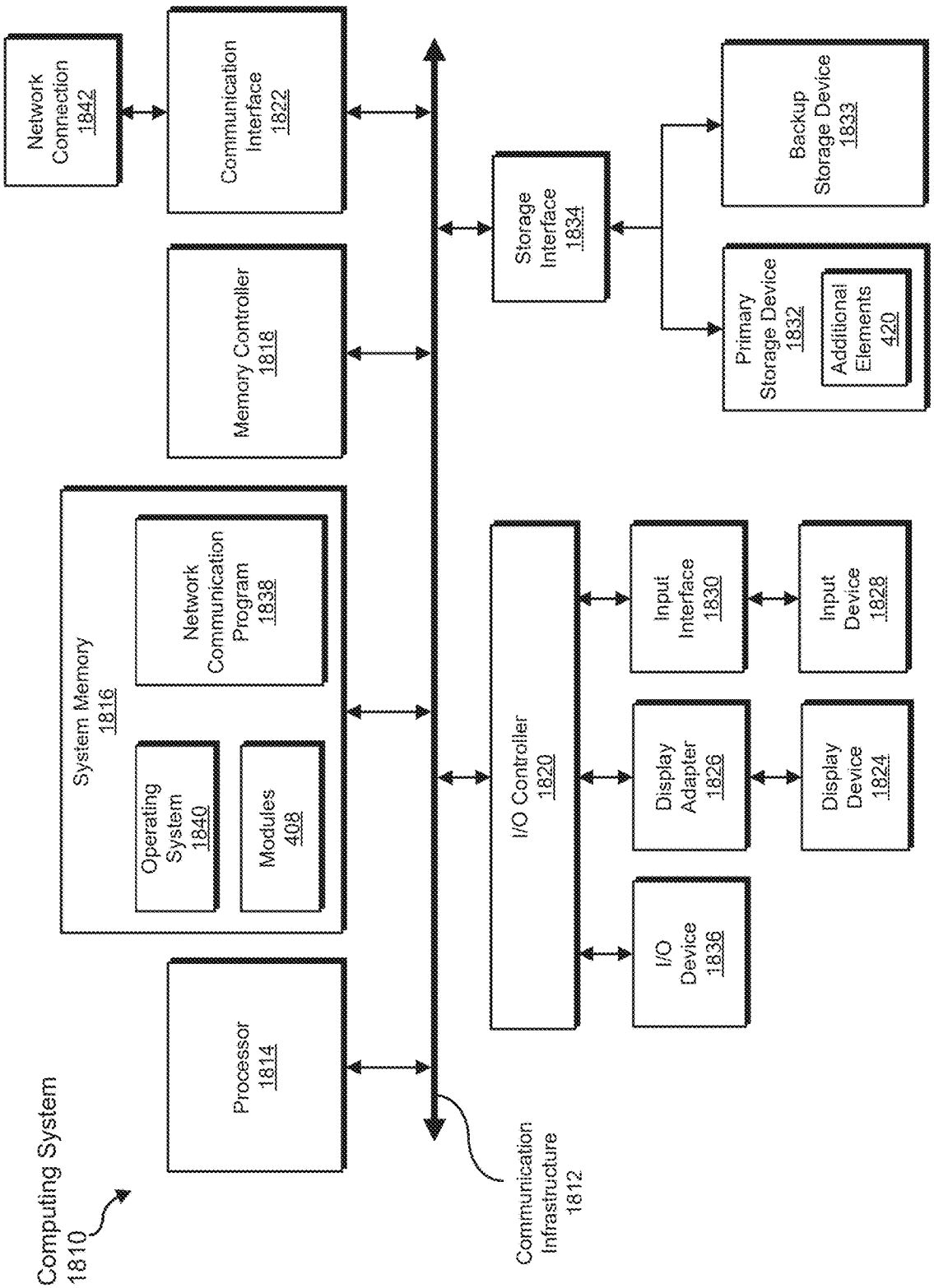
FIG. 18 shows a block diagram of an example computing system capable of implementing one or more embodiments described and/or illustrated herein, in accordance with some embodiments.

FIG. 18 is a block diagram of an example computing system 1810 capable of implementing one or more of the embodiments described and/or illustrated herein. For example, all or a portion of computing system 1810 may perform and/or be a means for performing, either alone or in combination with other elements, one or more of the steps described herein (such as one or more of the steps illustrated in FIGS. 2, 3, 5, 15, and 17). All or a portion of computing system 1810 may also perform and/or be a means for performing any other steps, methods, or processes described and/or illustrated herein.

Computing system 1810 broadly represents any single or multi-processor computing device or system capable of executing computer-readable instructions. Examples of computing system 1810 include, without limitation, workstations, laptops, client-side terminals, servers, distributed computing systems, handheld devices, or any other computing system or device. In its most basic configuration, computing system 1810 may include at least one processor 1814 and a system memory 1816.

Processor 1814 generally represents any type or form of physical processing unit (e.g., a hardware-implemented central processing unit) capable of processing data or interpreting and executing instructions. In certain embodiments, processor 1814 may receive instructions from a software application or module. These instructions may cause processor 1814 to perform the functions of one or more of the example embodiments described and/or illustrated herein.

System memory 1816 generally represents any type or form of volatile or non-volatile storage device or medium capable of storing data and/or other computer-readable instructions. Examples of system memory 1816 include, without limitation, Random Access Memory (RAM), Read Only Memory (ROM), flash memory, or any other suitable memory device. Although not required, in certain embodiments computing system 1810 may include both a volatile memory unit (such as, for example, system memory 1816) and a non-volatile storage device (such as, for example, primary storage device 1832, as described in detail below). In one example, one or more of the software components in FIG. 16 may be loaded into system memory 1816.

In some examples, system memory 1816 may store and/or load an operating system 1840 for execution by processor 1814. In one example, operating system 1840 may include and/or represent software that manages computer hardware and software resources and/or provides common services to computer programs and/or applications on computing system 1810. Examples of operating system 1840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1810 may also include one or more components or elements in addition to processor 1814 and system memory 1816. For example, as illustrated in FIG. 18, computing system 1810 may include a memory controller 1818, an Input/Output (I/O) controller 1820, and a communication interface 1822, each of which may be interconnected via a communication infrastructure 1812. Communication infrastructure 1812 generally represents any type or form of infrastructure capable of facilitating communication between one or more components of a computing device. Examples of communication infrastructure 1812 include, without limitation, a communication bus (such as an Industry Standard Architecture (ISA), Peripheral Component Interconnect (PCI), PCI Express (PCIe), or similar bus) and a network.

Memory controller 1818 generally represents any type or form of device capable of handling memory or data or controlling communication between one or more components of computing system 1810. For example, in certain embodiments memory controller 1818 may control communication between processor 1814, system memory 1816, and I/O controller 1820 via communication infrastructure 1812.

I/O controller 1820 generally represents any type or form of module capable of coordinating and/or controlling the input and output functions of a computing device. For example, in certain embodiments I/O controller 1820 may control or facilitate transfer of data between one or more elements of computing system 1810, such as processor 1814, system memory 1816, communication interface 1822, display adapter 1826, input interface 1830, and storage interface 1834.

As illustrated in FIG. 18, computing system 1810 may also include at least one display device 1824 coupled to I/O controller 1820 via a display adapter 1826. Display device 1824 generally represents any type or form of device capable of visually displaying information forwarded by display adapter 1826. Similarly, display adapter 1826 generally represents any type or form of device configured to forward graphics, text, and other data from communication infrastructure 1812 (or from a frame buffer, as known in the art) for display on display device 1824.

As illustrated in FIG. 18, example computing system 1810 may also include at least one input device 1828 coupled to I/O controller 1820 via an input interface 1830. Input device 1828 generally represents any type or form of input device capable of providing input, either computer or human generated, to example computing system 1810. Examples of input device 1828 include, without limitation, a keyboard, a pointing device, a speech recognition device, variations or combinations of one or more of the same, and/or any other input device.

Additionally or alternatively, example computing system 1810 may include additional I/O devices. For example, example computing system 1810 may include I/O device 1836. In this example, I/O device 1836 may include and/or represent a user interface that facilitates human interaction with computing system 1810. Examples of I/O device 1836 include, without limitation, a computer mouse, a keyboard, a monitor, a printer, a modem, a camera, a scanner, a microphone, a touchscreen device, variations or combinations of one or more of the same, and/or any other I/O device.

Communication interface 1822 broadly represents any type or form of communication device or adapter capable of facilitating communication between example computing system 1810 and one or more additional devices. For example, in certain embodiments communication interface 1822 may facilitate communication between computing system 1810 and a private or public network including additional computing systems. Examples of communication interface 1822 include, without limitation, a wired network interface (such as a network interface card), a wireless network interface (such as a wireless network interface card), a modem, and any other suitable interface. In at least one embodiment, communication interface 1822 may provide a direct connection to a remote server via a direct link to a network, such as the Internet. Communication interface 1822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1822 may also represent a host adapter configured to facilitate communication between computing system 1810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1822 may also allow computing system 1810 to engage in distributed or remote computing. For example, communication interface 1822 may receive instructions from a remote device or send instructions to a remote device for execution.

In some examples, system memory 1816 may store and/or load a network communication program 1838 for execution by processor 1814. In one example, network communication program 1838 may include and/or represent software that enables computing system 1810 to establish a network connection 1842 with another computing system (not illustrated in FIG. 18) and/or communicate with the other computing system by way of communication interface 1822. In this example, network communication program 1838 may direct the flow of outgoing traffic that is sent to the other computing system via network connection 1842. Additionally or alternatively, network communication program 1838 may direct the processing of incoming traffic that is received from the other computing system via network connection 1842 in connection with processor 1814.

Although not illustrated in this way in FIG. 18, network communication program 1838 may alternatively be stored and/or loaded in communication interface 1822. For example, network communication program 1838 may include and/or represent at least a portion of software and/or firmware that is executed by a processor and/or Application Specific Integrated Circuit (ASIC) incorporated in communication interface 1822.

As illustrated in FIG. 18, example computing system 1810 may also include a primary storage device 1832 and a backup storage device 1833 coupled to communication infrastructure 1812 via a storage interface 1834. Storage devices 1832 and 1833 generally represent any type or form of storage device or medium capable of storing data and/or other computer-readable instructions. For example, storage devices 1832 and 1833 may be a magnetic disk drive (e.g., a so-called hard drive), a solid state drive, a floppy disk drive, a magnetic tape drive, an optical disk drive, a flash drive, or the like. Storage interface 1834 generally represents any type or form of interface or device for transferring data between storage devices 1832 and 1833 and other components of computing system 1810. In one example, one or more of the software components in FIG. 16 may be stored and/or loaded in primary storage device 1832.

In certain embodiments, storage devices 1832 and 1833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1832 and 1833 may also include other similar structures or devices for allowing computer software, data, or other computer-readable instructions to be loaded into computing system 1810. For example, storage devices 1832 and 1833 may be configured to read and write software, data, or other computer-readable information. Storage devices 1832 and 1833 may also be a part of computing system 1810 or may be a separate device accessed through other interface systems.

Many other devices or subsystems may be connected to computing system 1810. Conversely, all of the components and devices illustrated in FIG. 18 need not be present to practice the embodiments described and/or illustrated herein. The devices and subsystems referenced above may also be interconnected in different ways from that shown in FIG. 18. Computing system 1810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1810. All or a portion of the computer program stored on the computer-readable medium may then be stored in system memory 1816 and/or various portions of storage devices 1832 and 1833. When executed by processor 1814, a computer program loaded into computing system 1810 may cause processor 1814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1810 may be configured as an Application Specific Integrated Circuit (ASIC) adapted to implement one or more of the example embodiments disclosed herein.

Figure 19:
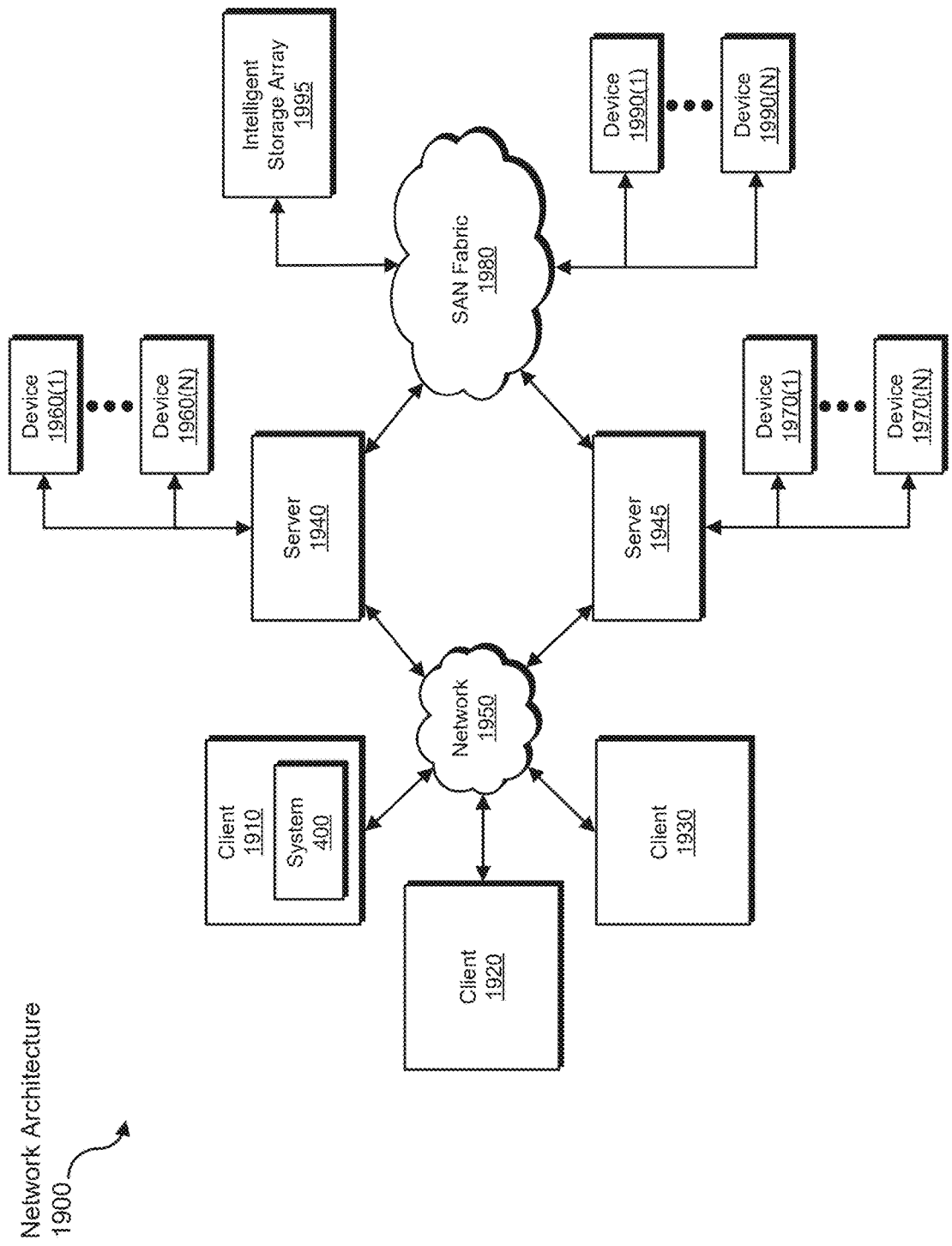
FIG. 19 shows a block diagram of an example computing network capable of implementing one or more of the embodiments described and/or illustrated herein, in accordance with some embodiments.

FIG. 19 is a block diagram of an example network architecture 1900 in which client systems 1910, 1920, and 1930 and servers 1940 and 1945 may be coupled to a network 1950. As detailed above, all or a portion of network architecture 1900 may perform and/or be a means for performing, either alone or in combination with other elements, one or more of the steps disclosed herein (such as one or more of the steps illustrated in FIGS. 2, 3, 5, 15, and 17). All or a portion of network architecture 1900 may also be used to perform and/or be a means for performing other steps and features set forth in the instant disclosure.

Client systems 1910, 1920, and 1930 generally represent any type or form of computing device or system, such as example computing system 1810 in FIG. 18. Similarly, servers 1940 and 1945 generally represent computing devices or systems, such as application servers or database servers, configured to provide various database services and/or run certain software applications. Network 1950 generally represents any telecommunication or computer network including, for example, an intranet, a WAN, a LAN, a PAN, or the Internet. In one example, client systems 1910, 1920, and/or 1930 and/or servers 1940 and/or 1945 may include all or a portion of the systems described in FIG. 4.

As illustrated in FIG. 19, one or more storage devices 1960(1)-(N) may be directly attached to server 1940. Similarly, one or more storage devices 1970(1)-(N) may be directly attached to server 1945. Storage devices 1960(1)-(N) and storage devices 1970(1)-(N) generally represent any type or form of storage device or medium capable of storing data and/or other computer-readable instructions. In certain embodiments, storage devices 1960(1)-(N) and storage devices 1970(1)-(N) may represent Network-Attached Storage (NAS) devices configured to communicate with servers 1940 and 1945 using various protocols, such as Network File System (NFS), Server Message Block (SMB), or Common Internet File System (CIFS).

Servers 1940 and 1945 may also be connected to a Storage Area Network (SAN) fabric 1980. SAN fabric 1980 generally represents any type or form of computer network or architecture capable of facilitating communication between a plurality of storage devices. SAN fabric 1980 may facilitate communication between servers 1940 and 1945 and a plurality of storage devices 1990(1)-(N) and/or an intelligent storage array 1995. SAN fabric 1980 may also facilitate, via network 1950 and servers 1940 and 1945, communication between client systems 1910, 1920, and 1930 and storage devices 1990(1)-(N) and/or intelligent storage array 1995 in such a manner that devices 1990(1)-(N) and array 1995 appear as locally attached devices to client systems 1910, 1920, and 1930. As with storage devices 1960(1)-(N) and storage devices 1970(1)-(N), storage devices 1990(1)-(N) and intelligent storage array 1995 generally represent any type or form of storage device or medium capable of storing data and/or other computer-readable instructions.

In certain embodiments, and with reference to example computing system 1810 of FIG. 18, a communication interface, such as communication interface 1822 in FIG. 18, may be used to provide connectivity between each client system 1910, 1920, and 1930 and network 1950. Client systems 1910, 1920, and 1930 may be able to access information on server 1940 or 1945 using, for example, a web browser or other client software. Such software may allow client systems 1910, 1920, and 1930 to access data hosted by server 1940, server 1945, storage devices 1960(1)-(N), storage devices 1970(1)-(N), storage devices 1990(1)-(N), or intelligent storage array 1995. Although FIG. 19 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1940, server 1945, storage devices 1960(1)-(N), storage devices 1970(1)-(N), storage devices 1990(1)-(N), intelligent storage array 1995, or any combination thereof. All or a portion of one or more of the example embodiments disclosed herein may also be encoded as a computer program, stored in server 1940, run by server 1945, and distributed to client systems 1910, 1920, and 1930 over network 1950.

As detailed above, computing system 1810 and/or one or more components of network architecture 1900 may perform and/or be a means for performing, either alone or in combination with other elements, one or more steps of an example method for virtual care.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the systems described in FIG. 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of systems described in FIG. 4 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the systems described in FIG. 4 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the systems described in FIG. 4 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the systems described in FIG. 4 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the systems described in FIG. 4 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. A method for customizing a dental appliance for a patient, comprising determining a design for the dental appliance; segment the design into a plurality of bands for analysis; for each of the plurality of bands, analyzing the band by: calculating forces applied by the band; and optimizing the band based on the calculated forces; updating the design by stitching together the optimized bands; and generating instructions for fabricating the dental appliance based on the updated design.

Clause 2. The method of clause 1, wherein the forces applied by the band include an expansion force provided by the design.

Clause 3. The method of clause 1, wherein the forces applied by the band include a force distribution on teeth of the patient.

Clause 4. The method of clause 1, wherein calculating forces applied by the band further comprises generating a plurality of variations of the band varying by thickness and patient anatomy.

Clause 5. The method of clause 4, wherein calculating forces applied by the band further comprises performing finite element analysis on the band and determining a correlation between thickness and forces applied based on patient anatomy.

Clause 6. The method of clause 5, wherein optimizing the band further comprises using machine learning to fit the design to the finite element analysis.

Clause 7. The method of clause 6, wherein the machine learning comprises a regularized multi-linear regression.

Clause 8. The method of clause 1, wherein determining the design includes an overly thick design.

Clause 9. The method of clause 8, wherein optimizing the band further comprises using topology optimization to reduce forces applied and a volume of the band to achieve a target force.

Clause 10. The method of clause 9, where an input to the topology optimization includes a desired relative stiffness value for each tooth.

Clause 11. The method of clause 9, wherein the topology optimization includes removing material from the design to reduce forces applied and the volume of the band.

Clause 12. The method of clause 11, wherein removing material comprises removing material from a non-palatal side of the band.

Clause 13. The method of clause 9, wherein the topology optimization comprises using a force-volume curve to interpolate between the bands.

Clause 14. The method of clause 1, wherein calculating forces applied further comprises calculating forces applied based on a thickness of the band.

Clause 15. The method of clause 14, wherein optimizing the band further comprises determining a desired thickness of the band based on an input anatomy and a desired force for the input anatomy.

Clause 16. The method of clause 15, wherein stitching together the optimized bands further comprises using a smoothing function between each band for each desired thickness.

Clause 17. The method of clause 14, wherein the thickness is measured in an occlusal direction.

Clause 18. The method of clause 17, wherein the thickness is reduced along the occlusal direction.

Clause 19. A system for customizing a dental appliance for a patient, the system comprising: a processor; and memory configured with instructions that when executed by the processor cause the system to: determine a design for the dental appliance; segment the design into a plurality of bands for analysis; for each of the plurality of bands, analyze the band by: calculating forces applied by the band; and optimizing the band based on the calculated forces; update the design by stitching together the optimized bands; and generate instructions for fabricating the dental appliance based on the updated design.

Clause 20. The system of clause 19, wherein the forces applied by the band include an expansion force provided by the design.

Clause 21. The system of clause 19, wherein the forces applied by the band include a force distribution on teeth of the patient.

Clause 22. The system of clause 19, wherein calculating forces applied by the band further comprises generating a plurality of variations of the band varying by thickness and patient anatomy.

Clause 23. The system of clause 23, wherein calculating forces applied by the band further comprises performing finite element analysis on the band and determining a correlation between thickness and forces applied based on patient anatomy.

Clause 24. The system of clause 24, wherein optimizing the band further comprises using machine learning to fit the design to the finite element analysis.

Clause 25. The system of clause 25, wherein the machine learning comprises a regularized multi-linear regression.

Clause 26. The system of clause 19, wherein determining the design includes an overly thick design.

Clause 27. The system of clause 26, wherein optimizing the band further comprises using topology optimization to reduce forces applied and a volume of the band to achieve a target force.

Clause 28. The system of clause 27, where an input to the topology optimization includes a desired relative stiffness value for each tooth.

Clause 29. The system of clause 27 wherein the topology optimization includes removing material from the design to reduce forces applied and the volume of the band.

Clause 30. The system of clause 29, wherein removing material comprises removing material from a non-palatal side of the band.

Clause 31. The system of clause 27, wherein the topology optimization comprises using a force-volume curve to interpolate between the bands.

Clause 32. The system of clause 19, wherein calculating forces applied further comprises calculating forces applied based on a thickness of the band.

Clause 33. The system of clause 32, wherein optimizing the band further comprises determining a desired thickness of the band based on an input anatomy and a desired force for the input anatomy.

Clause 34. The system of clause 33, wherein stitching together the optimized bands further comprises using a smoothing function between each band for each desired thickness.

Clause 35. The system of clause 32, wherein the thickness is measured in an occlusal direction.

Clause 36. The system of clause 35, wherein the thickness is reduced along the occlusal direction.

Clause 37. A dental device comprising: a body having: a first plurality of tooth receiving cavities shaped to receive teeth of a first side of an arch of a patient; a second plurality of tooth receiving cavities shaped to receive teeth of a second side of an arch of a patient; a palatal portion that extends between the first plurality of tooth receiving cavities and the second plurality of tooth receiving cavities and shaped to apply an expansion force to the teeth of the first side of the arch of the patient and the teeth of the second side of the arch of a patient, wherein the portion includes a plurality of bands that extend between the first plurality of tooth receiving cavities and the second plurality of tooth receiving cavities, each respective band having a respective different thickness.

Clause 38. The dental device of clause 37, wherein: the plurality of bands includes a first band, a second band, and a third band.

Clause 39. The dental device of clause 38, wherein: the first band has a first central thickness of the body at a center of the palatal portion; the second band has a second central thickness of the body at the center of the palatal portion; and the third band has a third central thickness of the body at the center of the palatal portion.

Clause 40. The dental device of clause 37, wherein: the palatal portion of the body has a first thickness, a crown portion of the first and second tooth receiving cavities of the body have a second thickness; and a buccal portion of the body has a third thickness.

Clause 41. The dental device of clause 40, wherein: the body further includes: a first transition zone between the palatal portion of the body and the crown portion of the first tooth receiving cavities of the body, wherein a thickness of the body transitions from the first thickness to the second thickness.

Clause 42. The dental device of clause 41, wherein: the body further includes: a second transition zone between the crown portion of the first tooth receiving cavities of the body and the buccal portion of the body, wherein a thickness of the body transitions from the second thickness to the third thickness.

Clause 43. The dental device of clause 41, wherein the transition from the first thickness to the second thickness is linear.

Clause 44. The dental device of clause 41, wherein the transition from the first thickness to the second thickness is a linear interpolation of the first thickness and the second thickness along the transition zone.

Clause 45. The dental device of clause 42, wherein the first transition zone begins at a location along the body between a center of the palatal portion and a lingual ridge of the tooth receiving cavity.

Clause 46. The dental device of clause 42, wherein the second transition zone begins at a location along the body between a lingual ridge of the tooth receiving cavity and a buccal ridge of the tooth receiving cavity and ends at a location buccal to the buccal ridge.

Clause 47. The device of clause 37, further comprising a handle extending buccally away from an outer buccal surface of the first plurality of tooth receiving cavities.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A method for customizing a palatal expander for a patient, comprising:
   generating an initial geometry of a palatal expander based on scan data of the patient's intraoral anatomy;
   segmenting initial geometry of the palatal expander into a plurality of bands for analysis, each of the plurality of bands shaped to engage with and extend from teeth of the patient on a first side of a dental arch of a patient, across a palate of the patient, to engage with teeth of the patient on a second side of the dental arch of patient;
   for each of the plurality of bands, analyzing the band by:
   calculating expansion forces applied by the band to the patient when the palatal expander is worn by the patient based on a geometry of the band and the scan data of the patient's intraoral anatomy; and
   modifying the geometry of the band based on the calculated expansion forces;
   stitching together the bands having respective modified geometries to form an updated geometry for the palatal expander; and generating instructions for fabricating the palatal expander based on the updated geometry, and fabricating the palatal expander based on the updated geometry.

2. The method of claim 1, wherein the expansion forces applied by the band include a force distribution on teeth of the patient based on scan data of the patient's intraoral anatomy.

3. The method of claim 1, wherein calculating expansion forces applied by the band further comprises generating a plurality of variations of the band varying by thickness and patient anatomy.

4. The method of claim 3, wherein calculating expansion forces applied by the band further comprises performing finite element analysis on the band and determining a correlation between thickness and forces applied based on patient anatomy.

5. The method of claim 4, wherein optimizing the band further comprises using machine learning model trained based on finite element analysis to model forces applied by the band.

6. The method of claim 5, wherein the machine learning comprises a regularized multi-linear regression.

7. The method of claim 1, wherein determining the design initial geometry of the palatal expander includes a thickness that provides expansion forces greater than a target force.

8. The method of claim 7, wherein optimizing the band further comprises using topology optimization the based on scan data of the patient's intraoral anatomy and the geometry of the palatal expander to reduce forces applied and a volume of the band to achieve the target force.

9. A dental appliance formed by the method of claim 1 and comprising: a body having a palatal portion configured to extend between a first side of a dental arch and a second side of a dental arch and shaped to apply an expansion force to teeth of the first side of the arch of the patient and teeth of the second side of the arch of a patient, wherein the palatal portion includes the plurality of bands, each of the plurality of bands configured to extend between the first side of a dental arch and the second side of a dental arch, each respective band having a respective different thickness.

10. The dental appliance of claim 9, wherein: the plurality of bands includes a first band, a second band, and a third band.

11. The dental appliance of claim 10, wherein:
the first band has a first central thickness of the body at a center of the palatal portion;
the second band has a second central thickness of the body at the center of the palatal portion;
and the third band has a third central thickness of the body at the center of the palatal portion.

12. The dental appliance of claim 9, wherein the body further comprises:
a first plurality of tooth receiving cavities shaped to receive teeth of the first side of the arch of the patient; and
a second plurality of tooth receiving cavities shaped to receive teeth of the second side of the arch of the patient, and wherein the palatal portion of the body has a first thickness,
a crown portion of the first and second tooth receiving cavities of the body have a second thickness, and
a buccal portion of the body has a third thickness.

13. The dental appliance of claim 12, wherein the body further includes: a first transition zone between the palatal portion of the body and the crown portion of the first tooth receiving cavities of the body, wherein a thickness of the body transitions from the first thickness to the second thickness.

14. The dental appliance of claim 13, wherein the body further includes: a second transition zone between the crown portion of the first tooth receiving cavities of the body and a buccal portion of the body, wherein a thickness of the body transitions from the second thickness to the third thickness.

15. The dental appliance of claim 13, wherein the transition from the first thickness to the second thickness is linear.

16. The dental appliance of claim 13, wherein the transition from the first thickness to the second thickness is a linear interpolation of the first thickness and the second thickness along the transition zone.

17. The dental appliance of claim 14, wherein the first transition zone begins at a location along the body between a center of the palatal portion and a lingual ridge of the tooth receiving cavity.

18. The dental appliance of claim 14, wherein the second transition zone begins at a location along the body between a lingual ridge of the tooth receiving cavity and a buccal ridge of the tooth receiving cavity and ends at a location buccal to the buccal ridge.

19. The dental appliance of claim 9, wherein the body further comprises:
a first plurality of tooth receiving cavities shaped to receive teeth of the first side of the arch of the patient; and a handle extending buccally away from an outer buccal surface of the first plurality of tooth receiving cavities.

* * * * *